United States Patent
Scheinberg et al.

(10) Patent No.: US 7,376,614 B1
(45) Date of Patent: May 20, 2008

(54) CLEARING SYSTEM FOR AN ELECTRONIC-BASED MARKET

(75) Inventors: Larry Scheinberg, Boston, MA (US); David Scheinberg, Carlisle, MA (US)

(73) Assignee: The Clearing Corporation, Chicago, IL (US)

( * ) Notice: Subject to any disclaimer, the term of this patent is extended or adjusted under 35 U.S.C. 154(b) by 710 days.

(21) Appl. No.: 09/667,894

(22) Filed: Sep. 22, 2000

(51) Int. Cl.
*G06Q 40/00* (2006.01)

(52) U.S. Cl. .......................... 705/37; 705/38
(58) Field of Classification Search ................ 705/35, 705/36, 37
See application file for complete search history.

(56) References Cited

U.S. PATENT DOCUMENTS

| | | | |
|---|---|---|---|
| 4,823,265 A * | 4/1989 | Nelson | 705/35 |
| 4,903,201 A | 2/1990 | Wagner | 364/408 |
| 4,953,085 A * | 8/1990 | Atkins | 705/36 |
| 4,980,826 A | 12/1990 | Wagner | 364/408 |
| 5,148,365 A * | 9/1992 | Dembo | 705/36 |
| 5,802,499 A * | 9/1998 | Sampson et al. | 705/35 |
| 5,832,462 A | 11/1998 | Midorikawa et al. | 705/35 |
| 5,924,082 A * | 7/1999 | Silverman et al. | 705/37 |
| 5,930,762 A * | 7/1999 | Masch | 705/7 |
| 5,963,923 A * | 10/1999 | Garber | 705/37 |
| 6,014,627 A | 1/2000 | Togher et al. | 705/1 |
| 6,029,146 A | 2/2000 | Hawkins et al. | |
| 6,304,858 B1 * | 10/2001 | Mosler et al. | 705/37 |
| 2001/0049651 A1 * | 12/2001 | Selleck | 705/37 |

OTHER PUBLICATIONS

U.S. Appl. No. 60/200,248, filed Apr. 2000, Selleck, Mark N.*
"Clearing 21", Press Office Archives, http://www.matif.fr/new_/new_press193.htm; Dec. 1998, pp. 1-14.
"Screen-Based Trading Systems For Derivative Products", International Organization of Securities Commissions, Report of the Technical Committee, Jun. 1990, pp. 1-52.

* cited by examiner

*Primary Examiner*—James A. Kramer
*Assistant Examiner*—Thu Thao Havan
(74) *Attorney, Agent, or Firm*—Fish & Richardson P.C.

(57) ABSTRACT

A system for an electronic-based market is disclosed. The system operates with a model where a trader is designated to enter orders for contracts on behalf of a subscriber. The model uses assets of the subscriber that are placed into an account that is accessible by the electronic market to cover risks associated with trades initiated by the trader. The system includes a plurality of client stations for entering orders into the electronic market by traders and a server to receive the orders and match the orders in accordance with matching criteria. The server maintains for the subscriber and the subscriber's associated traders a trading account that is accessible by the electronic market. The server also includes offsetting, clearing, default, and margin protocols functions to administer the market. The market uses species contracts that are derived from a contract genus.

22 Claims, 24 Drawing Sheets

| Product Specs | Place an Order | Order Book | Confirmed Trades | Trade History |

Place an Order

All Times in Eastern Standard Time

Price can either be a number such as .75 (75 cents), a Contract, or a Contract + or - [number]. The number can be from .000 to 999.
Examples:  C = Contract, C+.01 = Contract + one cent, C-.005 = Contract - one half cent, C+1 = Contract + one dollar.

New Order

(142) → Posting Type   ● Buy   ○ Sell         Product        Benzene ▼
                                              Product Spec   ASTM ▼

(144) → Delivery Terms   Any ▼                Delivery Month   Jan ▼   2000 ▼
        Location         Hou/Tex City ▼       Freight Terms    FOB ▼
        Quantity         20                   Units            MT ▼
        Price            1.01                 Units            gal ▼
        Comments         _____

[ SUBMIT ]
                                                           ↖ 140

FIG. 7A

Product Specs

Product Specs | Place an Order | Order Book | Confirmed Trades | Trade History

If these Product specification definitions do not accurately reflect the specifications needed to properly identify the products or if there are other specification definitions needed please contact onExchange.com.

| Product Genre | Product Species | Frt | Location | Qty | Price | Delivery |
|---|---|---|---|---|---|---|
| Benzene | ASTM 2359 | FOB | Hou/Tex City | 10 M bbl | 0.4500 gal | Any Dec |
| Benzene | ASTM 2359 LT | FOB | Hou/Tex City | 10 M bbl | 0.4500 gal | Any Dec |
| Benzene | ASTM 2359 LTLD | FOB | Hou/Tex City | 10 M bbl | 0.4500 gal | Any Dec |
| Benzene | ASTM 4734 | FOB | Houston | 10 M bbl | 0.4500 gal | Any Dec |
| Benzene | ASTM zero D | FOB | Houston | 20 M bbl | 0.4500 gal | Any Dec |
| Benzene | BASF Spec | FOB | Hou/Tex City | 20 M bbl | 0.4500 gal | Any Dec |
| Benzene | Cyclo | CIF | Houston | 40 M bbl | 0.4500 gal | Any Dec |
| Benzene | AShell Moerdjik | CIF | Houston | 40 M bbl | 0.4500 gal | Any Dec |
| Methanol | ASTM D-1152 | CIF | Houston | 40 M bbl | 0.4500 gal | Any Dec |
| Methanol | IMPCA 1996 | CIF | Hou/Tex City | 40 M bbl | 0.4500 gal | Any Dec |
| Mx Xylenes | ASTM 5211 | CIF | Hou/Tex City | 40 M bbl | 0.4500 gal | Any Dec |
| Mx Xylenes | ASTM 5211BF | CIF | ARA | 40 M bbl | 0.4500 gal | Any Dec |
| Mx Xylenes | ASTM 843 | CIF | Houston | 40 M bbl | 0.4500 gal | Any Dec |
| Mx Xylenes | ASTM 5023 | CIF | Corpu Christi | 40 M bbl | 0.4500 gal | Any Dec |
| Mx Xylenes | ASTM 1173 | CIF | ARA | 40 M bbl | 0.4500 gal | Any Dec |

FIG. 70

CLEARING SYSTEM FOR AN ELECTRONIC-BASED MARKET

BACKGROUND

This invention relates to trading systems.

A traditional futures exchange is a membership structure that allows trading only through members. Traditional markets have customers, members and clear members. The financial backing of a traditional exchange is also through members. Members provide capital and when a trade is completed a clearing member will back the trade. Some exchanges only allow their clearing members to trade. Other exchanges allow any person to trade as long as a clearing member backs the person. That is, a clear member can have customers that have accounts with the clear member. The customer uses the credit of the clear member to trade and the customer does not have direct access to the market.

SUMMARY

According to an aspect of the present invention, a method of clearing transactions on an electronic exchange includes performing a full settlement run after cessation of trading, automatically marking-to-market all open positions and determining margin requirements.

According to an additional aspect of the present invention, a computer program product residing on a computer readable medium for clearing transactions on an electronic exchange includes instructions for causing a computer to perform a full settlement run after cessation of trading, automatically mark-to-market all open positions and determine margin requirements for market participants.

According to an additional aspect of the present invention, a system for clearing transactions on an electronic exchange, includes a computer system that is fed information regarding trades, current prices for products traded on the exchange, information regarding margin available in a trading account and margin requirements for a contract genus. The system also includes a process that executes on the compute system, including a computer program product residing on a computer readable medium for clearing transactions on the electronic exchange. The product comprising instructions for causing the computer to perform a full settlement run after cessation of trading, automatically mark-to-market all open positions, and determine margin requirements for market participants.

One or more of the following advantages may be provided by one or more aspects of the invention.

Aspects of the invention are directed to clearing transactions in electronic markets that trade contracts to buy and sell goods. The clearing system minimizes the incidence of credit-induced financial losses, contains losses once they are identified, and ensures continuous market function and financial integrity. The system minimizes the likelihood that a particular participant will fail to meet its obligations to the exchange.

BRIEF DESCRIPTION OF THE DRAWINGS

FIGS. 7A-7D are diagrams of graphical user interfaces/screens used in the system of FIG. 1.

DESCRIPTION

Figure 1:
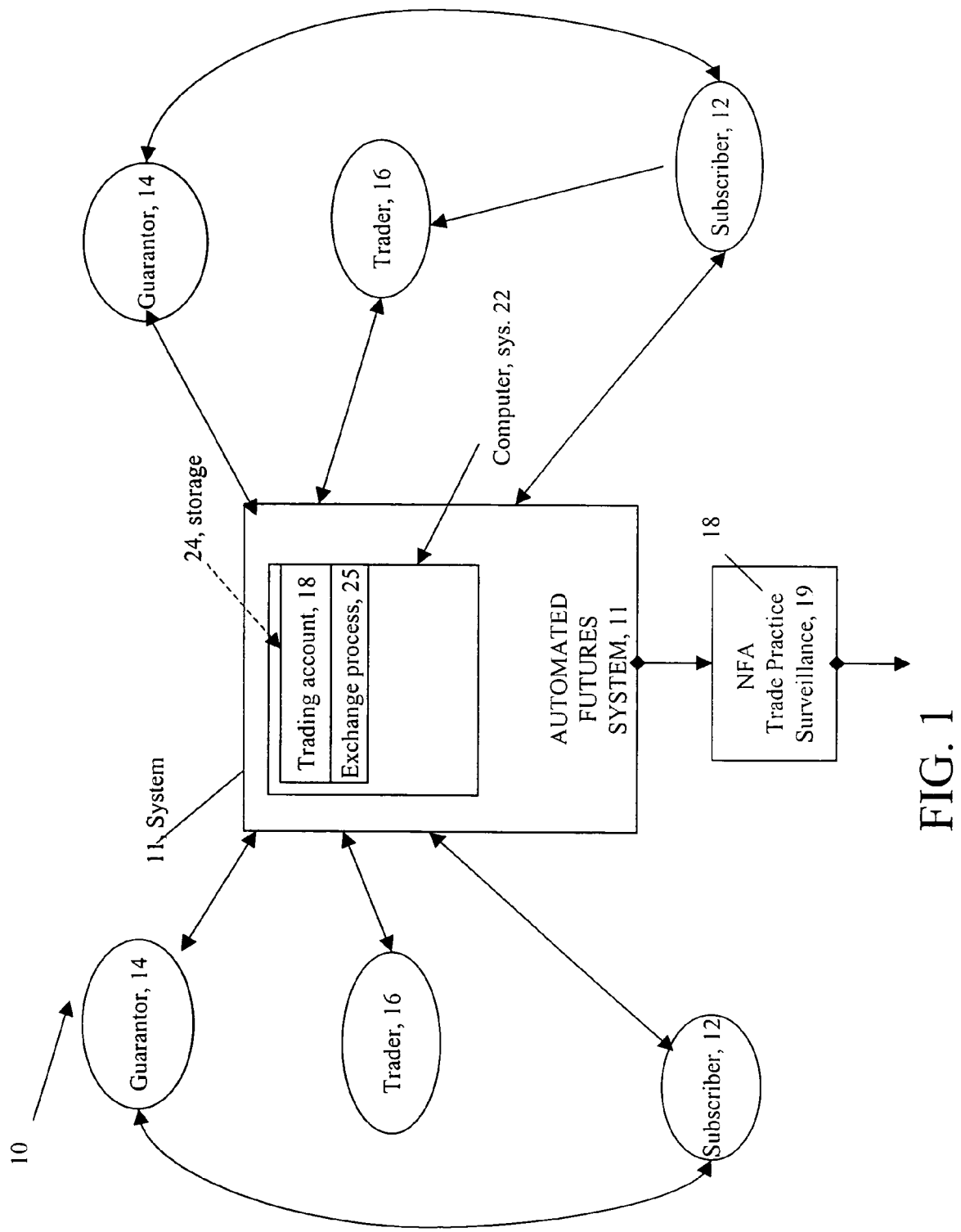
FIG. 1 is a block diagram of an electronic-based futures exchange.

Referring to FIG. 1, an electronic market 10 or exchange that trade contracts to buy and sell goods is shown. One example of the market is embodied as an electronic futures market. However, in addition to traditional futures type trading in commodity futures trading in contract of other products, instruments and services is possible.

The electronic futures market or exchange 10 has three defined relationships between market participants and the exchange 10. The relationships are represented as market participants that include a subscriber 12, guarantor 14, and trader 16. The market participants interact through a system 11. All three types of market participants have contractual relationships with the exchange 10 and are screened by an accrediting agency, e.g., the National Futures Association (NFA) for a US-based exchange (or equivalent) for disciplinary and financial soundness. Subscribers 12 identify one or more guarantors 14 who provide access to financial resources used for margin. Subscribers also identify one or more traders 16 who are eligible to enter orders for the subscriber's benefit. In some instances the subscriber 12, guarantor 14, and/or trader 16 may be the same entity.

The system 11 will be described in more detail below. Suffice it here to say that the system 11 includes computer systems 22 and storage devices 24 that store trading accounts 18 and the processes 25 used to implement the electronic futures exchange 10. The system 11 is accessed by the participants using the Internet or other protocols, as will be described below.

A subscriber 12 is the economic beneficiary of the trading that occurs on its behalf. Subscribers 12 may be natural persons or other legal entities. All subscribers 12 are subject to the provisions of an exchange subscriber agreement. Subscribers 12 identify assets acceptable to the exchange 10 that can be used for margin to support positions. The exchange 10 maintains at least one trading account 18 for each subscriber. The trading account 18 identifies the subscriber's positions and the assets used to support the positions. Subscribers 12 may have multiple trading accounts for multiple guarantors (not shown). Examples of subscribers 12 might include a customer of a futures commodities market (FCM), a corporation or financial institution, or a commodity pool. Positions held by a subscriber are associated with the exchange subscriber trading account 18. Each subscriber trading account 18 will also identify assets that provide margin for the positions held in that account. Positions are determined by product species that a trader 16 can trade on.

The second entity in the exchange 10 is a guarantor. A guarantor maintains the assets of the subscriber and makes those assets available to exchange 10. Guarantors 14 are credit-worthy entities. All guarantors 14 are subject to provisions of an exchange guarantor Agreement. The guarantor 14 gives the exchange 10 control over the assets in a subscriber's trading account 18. In particular, exchange 10 has the right to satisfy all margin obligations by contacting the guarantor and demanding payment. Failure of the guarantor 14 to provide timely payment would constitute a default on the part of the subscriber. Guarantors 14 can restrict the markets traded by a subscriber. Examples of a guarantor might include an FCM, bank, credit card facility, other financial institution, or a large corporation. In some instances the guarantor may be a subscriber.

A subscriber can maintain the trading account 18 and assets at a registered FCM, where the subscriber's funds will be segregated in accordance with CFTC requirements. In this case, the FCM will be considered the guarantor of its subscriber's trading account 18. A subscriber's trading account 18 can be guaranteed by a third-party, credit worthy institution, including a bank, broker dealer, or corporate entity. The guarantee relationship can be documented by a letter of credit or comparable agreement that allows the exchange 10 to have recourse against the guarantor in the event that the subscriber fails to perform its financial responsibilities, including initial margin and variation margin obligations up to a specified limit.

A self-guaranteeing subscriber is a corporation or other entity that has sufficient credit worthiness to bear the financial obligations of trading without requiring a third party's guarantee. The exchange 10 or other entity performs financial surveillance of self-guaranteeing subscribers 12 in order to maintain a high level of confidence and to deter abuse. A class of self-guaranteeing subscriber is the fully paid long subscriber. This subscriber deposits assets equal to the full-face amount of its futures positions at an exchange depository. This form of self-guarantee is available for long market positions.

A third entity in the market is the trader 16. A trader 16 enters orders on behalf of a subscriber 12. Traders 16 are natural persons. Depending on the subscriber/guarantor relationship, either the subscriber or its guarantor authorizes a trader 16 to enter orders for a subscriber's trading account 18. Without such authorization, a trader 16 cannot enter orders in the exchange 10. Examples of traders 16 might include the subscriber, a commodity trading advisor, an FCM order-entry clerk, or an employee of the subscriber. Several subscribers 12 may authorize the same trader 16 (e.g., a commodity trading advisor). Also, several traders 16 may be authorized for the same subscriber (e.g., employees of a corporation). Each category of trader 16 will be identified so that exchange 10 and/or the National Futures Association can perform trade practice surveillance 19. Traders will have account access privileges, a trading profile, and trading limits 17 that are reflected in the trading account 18.

Figure 2:
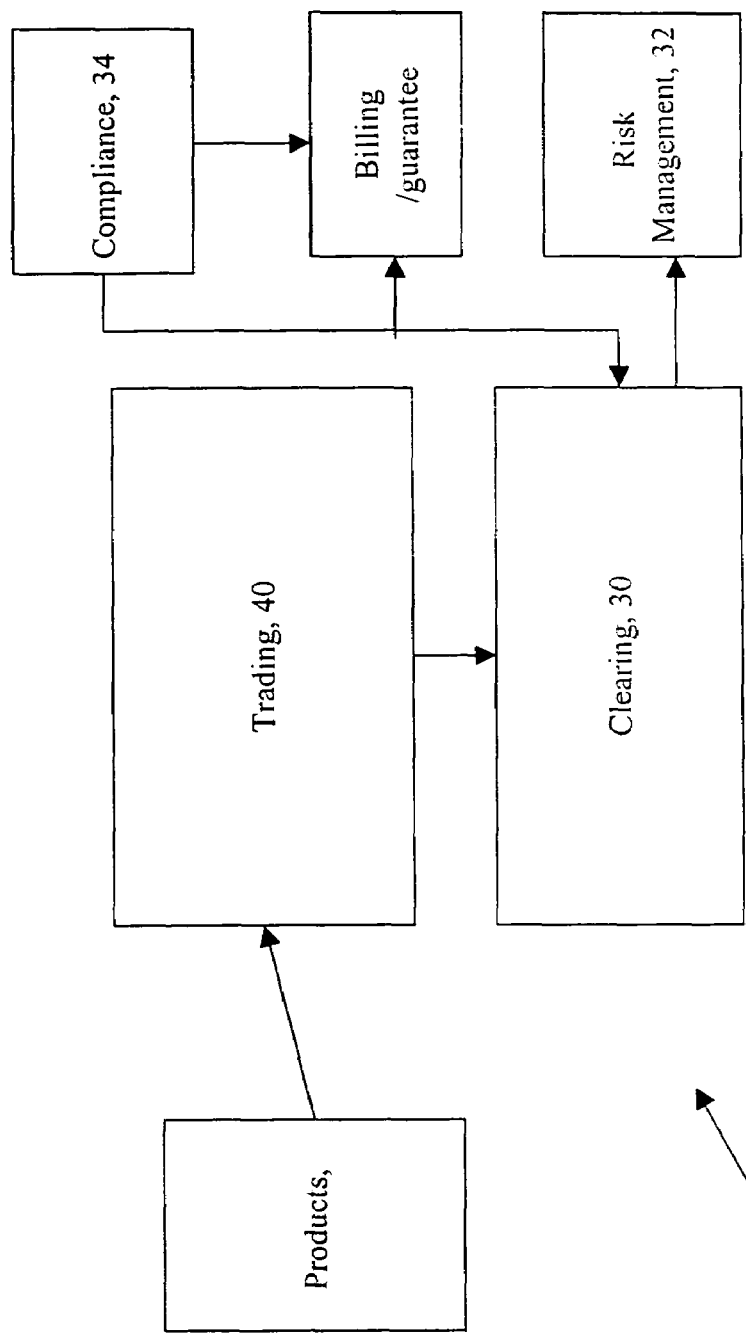
FIG. 2 is a diagram depicting a system architecture for the market of FIG. 1

Referring now to FIG. 2, the exchange 10 uses the market structure 10 described above in an Internet-based on-line trading system 11 having real-time clearing 30 and risk management 32 functions. Because all three types of market participants are known to the exchange 10, risk management 32, compliance and functions, 34 of the exchange 10 can be applied to any or all of the participant types.

The exchange 10 includes a trading system 40 that is accessible through secure sessions using Internet protocols. Traders 16 securely access the exchange 10 via web browsers on client systems (not shown). Additionally, non-browser user interface clients (not shown) capable of communicating with the exchange trading system 60 may be used. Generally, subscribers 12 and guarantors 14 will not have access to the trading system 40 for trading purposes. However, for risk management purposes, subscribers 12 and guarantors 14 may authorize system access to individuals in their control with supervisory responsibilities.

The exchange 10 can permit a single trader 16 to have several sessions open at the same time. Once logged on, a trader 16 may enter orders for any trading account 18 for which the trader 16 has permission to trade. In addition to any contract genus trading restrictions imposed on the trading account 18 by the subscriber or guarantor, additional trader-level limits may be preset, including restrictions on the maximum net long, net short, or quantity per order. These restrictions are supplemental to other risk management limitations imposed by the exchange risk management system 32 discussed below.

Figure 3:
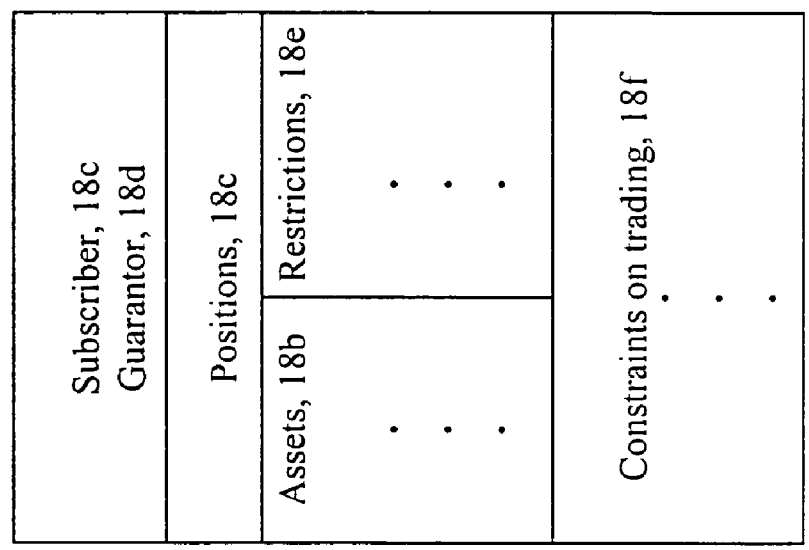
FIG. 3 is a diagram depicting a data structure for a trading account.
Figure 3:
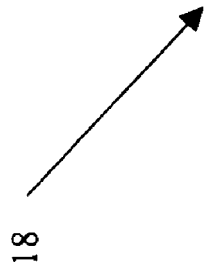

Referring to FIG. 3, a data structure 18' that represents a trading account 18 which is an internal exchange account is shown. The data structure 18' representing the trading account 18 is stored on a computer readable medium that is accessible by the processes in FIG. 2, as will be described below. A trading account 18 has fields 18a, 18b used to identify both positions and assets for a subscriber. Each trading account 18 also has fields 18c, 18d to associate the account 18 with a particular subscriber and guarantor, respectively. All trading activity for a subscriber flows through a trading account 18. The risk management system 32 verifies that sufficient assets are associated with the account to meet margin requirements for each new position. Assets are associated with a trading account 18 and are used to meet margin requirements for a subscriber's positions. Assets may be limited to support specific exchange 10 product genera or delivery commitments. Thus, the trading account 18 can include fields 18e that represent constraints on the assets, e.g., dedicated to particular produced genera or delivery commitments. Examples of assets include cash or cash equivalents on deposit with exchange 10, a segregated account held at an FCM, a letter of credit, or other financial institution guarantee. The trading account 18 can include constraint fields 18f to identify the product genera that the trader 16 is authorized to trade.

Figure 4:
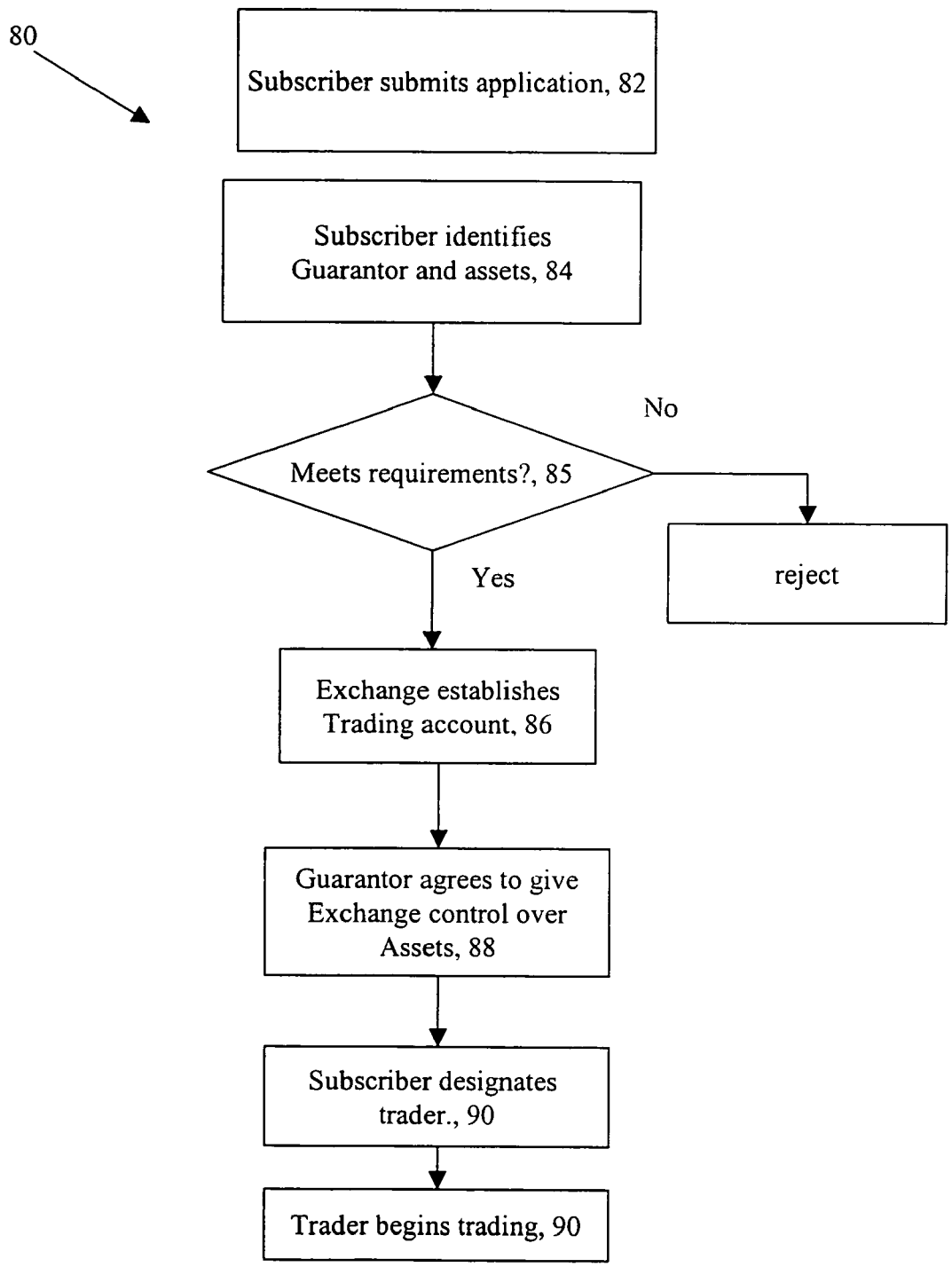
FIG. 4 is a flow chart depicting an account process flow.

Referring to FIG. 4, an account process flow 80 is shown. A subscriber submits 82 an application to the exchange 10. The subscriber identifies 84 a guarantor and the assets to be held by that guarantor. The exchange 10 and/or a regulatory body, e.g., the NFA, reviews 85 the application. If accepted, the exchange 10 establishes 86 a trading account 18 (FIG. 3) for the subscriber. The guarantor enters 88 into an agreement with the exchange 10 that gives the exchange 10 control over the asset(s). The subscriber or guarantor authorizes 90 a trader 16 to enter orders for the subscriber and trading begins.

Figure 5:
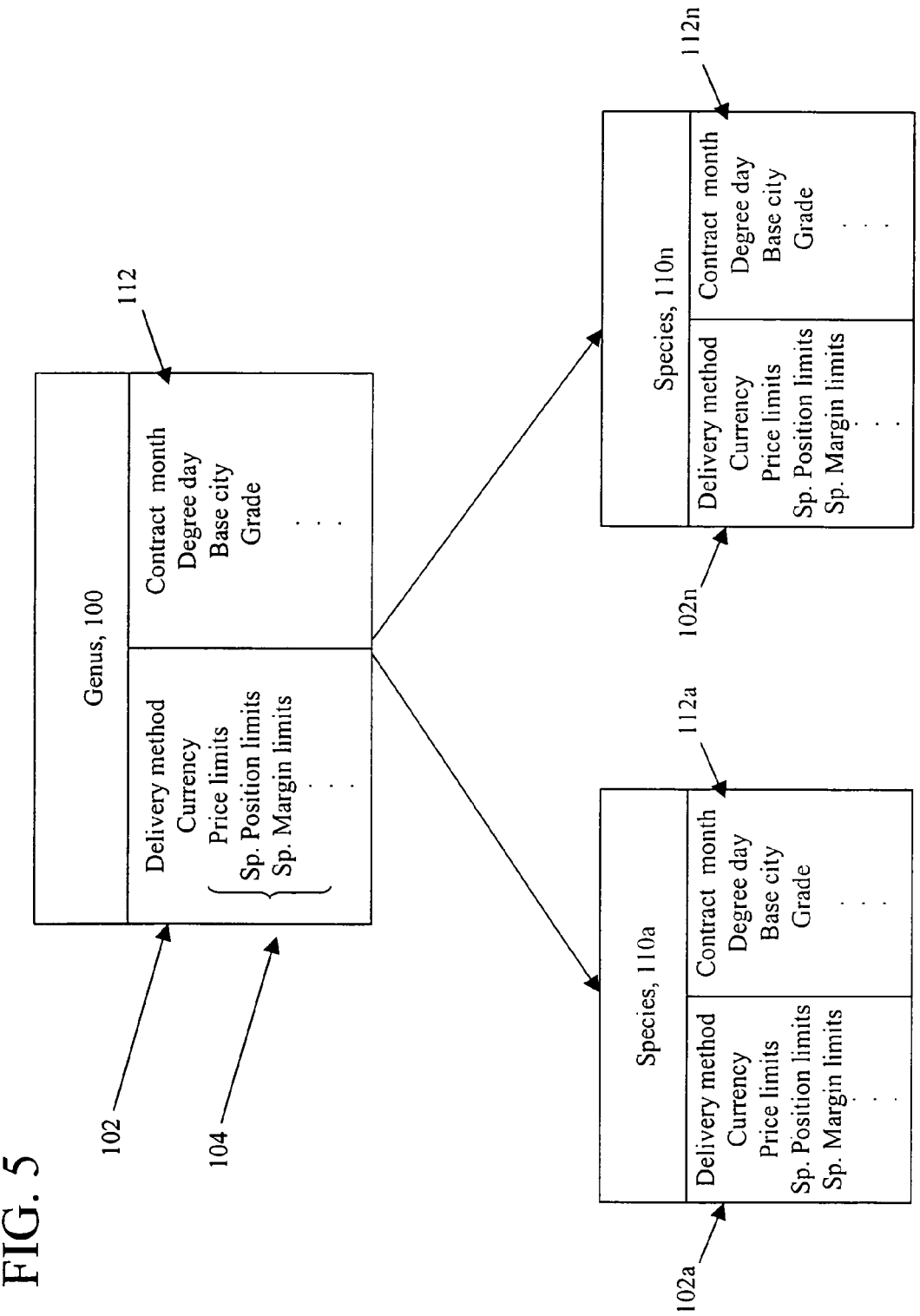
FIG. 5 is a diagram depicting relationship between contract species and a contract genus.

Referring to FIG. 5, contracts 110 for trading on the exchange 10 are shown. Contract markets available to subscribers 12 and their traders 16 are described by a contract genus 100. The contract genus 100 identifies a particular commodity or market type (e.g., contracts on corn, cotton, or natural gas, benzene, and so forth). The contract genus includes global parameters 102 that are applicable to all contracts derived from the contract genus. Thus, a properly specified contract genus encapsulates information necessary to operate risk management, market surveillance, trading, clearing, and delivery functions of the exchange 10. A contract genus definition 102 includes all parameters that are universally applicable to a contract (e.g., delivery method, underlying currency, price limits, speculative position limits, speculative margin rates and so forth).

Each contract genus also includes one or more contract species 110a-110n. The contract species 110a-110n are the actual contracts traded. Contract species have global parameters 102 inherited from the contract genus 100 as well as additional parameters 112a-112h that are specific to the species. The contract species 110a-110n define distinct positions in the subscriber's trading account 18. Species parameters 112 define various contract species that can be traded (e.g., contract month, degree-day base-city).

Some global parameters are inherited by each contract species but can be changed for each species individually. Examples of customized global parameters 104 include price limits, speculative position limits, speculative margin rates and so forth.

For example, exchange 10 can list a benzene futures genus. The exchange can define genus and species parameters to provide a market for the genus. To produce a contract for benzene, the exchange 10 provides three species parameters whose values are specified at order entry time (see TABLE 1 below):

TABLE 1

| PRODUCT GENUS: *BENZENE\** | | | |
| --- | --- | --- | --- |
| Type | Parameter | Possible Values | Default Value |
| Applies universally to all contract species | Delivery Method | Physical | N/A |
| | Base Currency | USD | N/A |
| Exchange can define separately for each contract species | Position Limit | 5,000,000 gals | 5,000,000 gals |
| | Daily Price Limit | $0.20 per gal | $0.20 per gal |
| Trader Selectable Trader selects at order entry time to define particular contract to be traded | Grade | astm 2359 astm 2359 lt astm 4734 astm zero d | astm 2359 |
| | Delivery Location | Houston Corpus Christi | Houston |
| | Delivery Month | June 2000 July 2000 August 2000 | July 2000 |

Contract Species permit listing of multi-parameter flexible contracts that can reflect particularized requirements of each market and market constituency. The exchange 10 includes a matching and clearing engine (described below) that permits matching of numerous types of orders across species to mitigate any reduced liquidity that comes from greater contract customization. Multi-parameter contracts can provide benefits including reduced basis risk, increased hedge efficiency, price discovery, and risk management even in low-volume markets.

Permission to trade a particular contract genus is enforced by the exchange risk management system 32. As mentioned, a guarantor 14 can restrict a particular subscriber 12 to trade only select contract genera, and subscribers 12 may further restrict contract genera available to traders 16.

Figure 6:
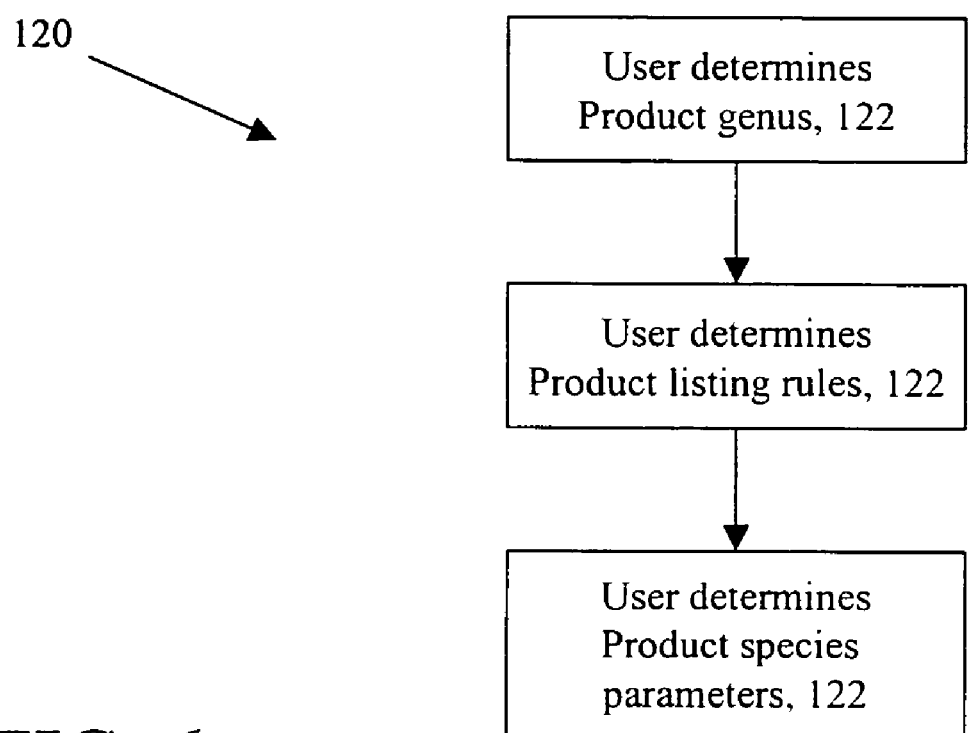
FIG. 6 is a flow chart of a contract authoring process.

Referring to FIG. 6, a contract authoring process 120 produces contract species from a contract genus. The contract authoring process 120 is used to produce new contracts that can be traded. A user decides on 122 a product genus and decides on 124 the listing rules for the product genus. The user decides 126 on species parameters that are associated with the product genus. The process 120 can use a wizard technique, e.g., a series of dialog boxes or windows with controls to specify and select parameters. After a contract genus 122 has been defined, the particular items necessary to enable the trading of various contract species are enumerated. For example, the 'contract month' parameter might be enumerated as (June 2000, September 2000, December 2000, and March 2001), while the 'degree day base city' parameter is enumerated as (Atlanta, Chicago, New York). Species parameters for a product are given in Table 1. Orders can be entered for any of the above species.

In one embodiment the contract authoring process 120 is used by the exchange 10 to produce contact genera and associated species. Alternatively, certain business-to-business exchanges can use the contract authoring process 120 to author their own contracts within the parameters of the exchange and any government regulation. One advantage is that the business-to-business exchanges might possess better knowledge concerning trading practices involved in the trading particular products in the business-to-business exchange. This level of customization can make the contracts more tradable and desirable than an exchange employee authoring all the contracts.

Figure 7B:
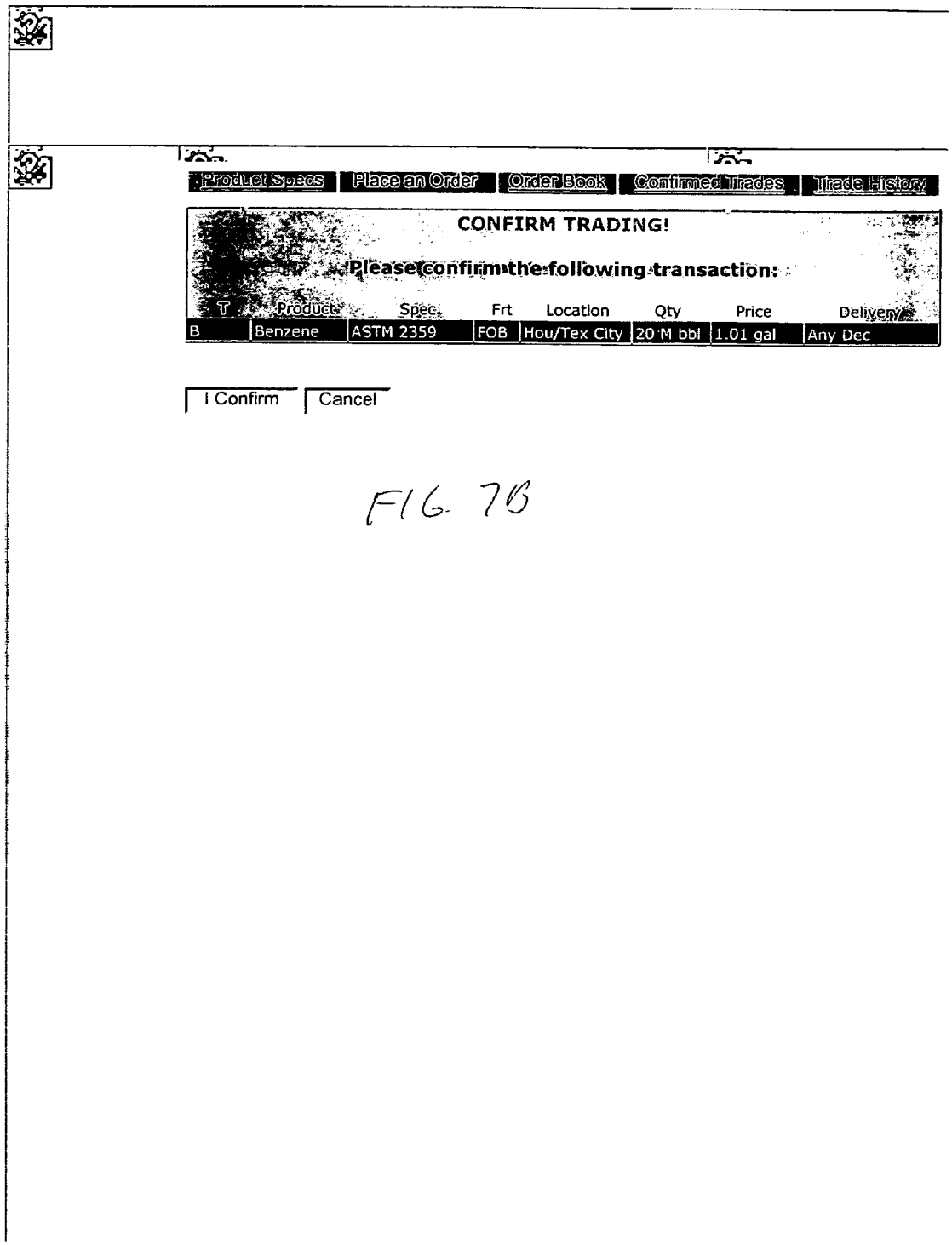
Figure 7C:
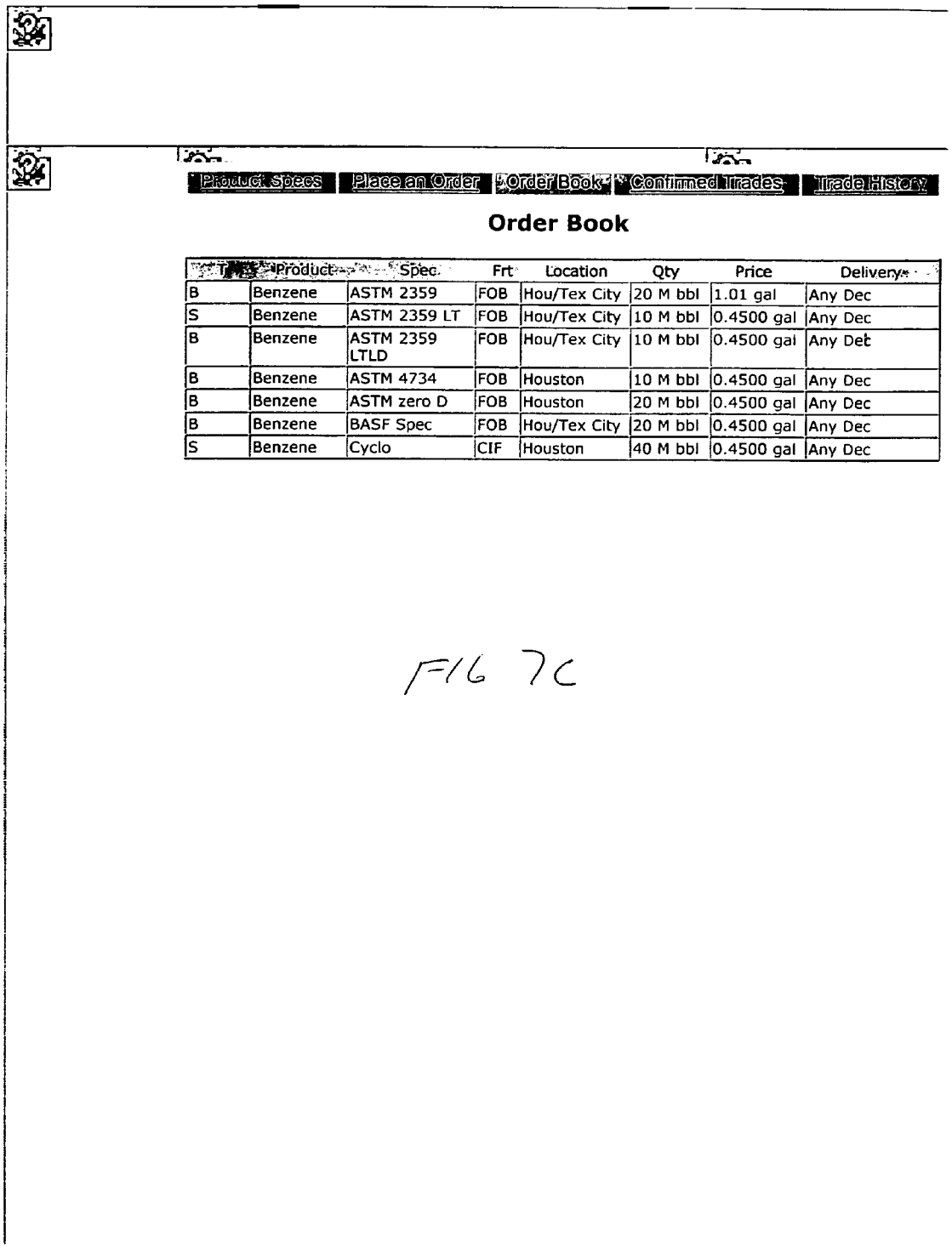

Referring to FIGS. 7A-7D, user interface screens, e.g., web pages are shown. FIG. 7A shows a user interface 140 to enter new orders into the system 10 is shown. The user interface 140 is implemented as a HTML or equivalent web page and includes fields for specifying an order type 142, i.e., buy or sell as well as order terms 144 such as delivery, location, quantity, price, product, product species, delivery month, freight terms and units. The price can be specified in a number of ways such as a value, e.g., number; a contract (market price) or a contract market price plus or minus a value, e.g., a relative price. In addition, there is a comment field that can be used to enter restrictions or qualifiers on the order. The system can also generate an order confirmation page as shown in FIG. 7B. Other screens include a web page that depicts the order book for a product, (FIG. 7C) as well as a page that depicts product specifications (FIG. 7D).

Figure 8:
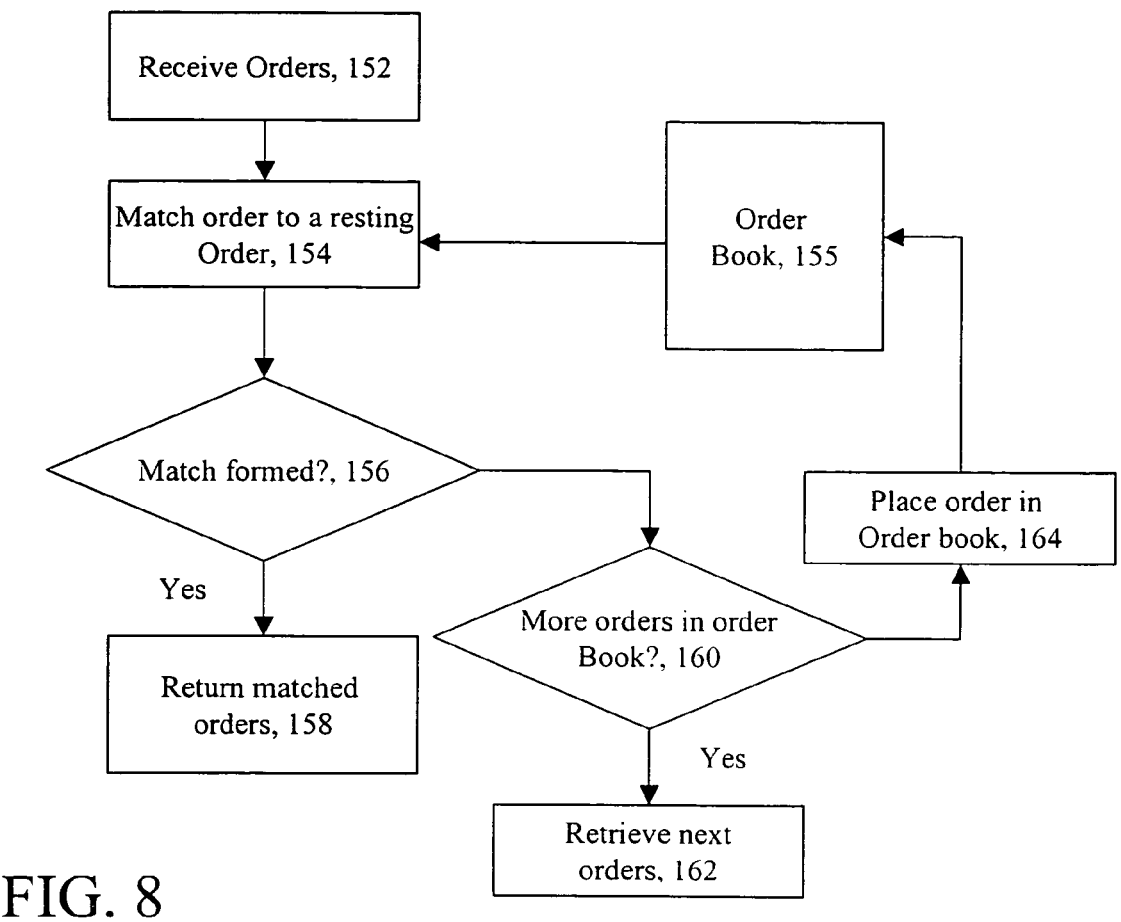
FIG. 8 is a flow chart of an order matching process.

Referring to FIG. 8, the exchange 10 includes a matching engine 150 that works with the order types and qualifiers, as shown in TABLE 2 below. The matching engine 150 receives 152 an order and attempts to match 154 the received order with orders on the opposite side of the market that are queued within an order book 155 in the system in accordance with a priority as set forth below. If the system can form a match 156, the match is returned 158. Otherwise, if the system cannot form a match, the system determines 160 whether there are more potentially matchable orders on the opposite side of the market that can be matched to the received order. If there are additional orders, the process will fetch 162 the next order. Otherwise, the process will store 164 the order in the order book in a priority, as specified below.

TABLE 2

ORDER TYPES AND QUALIFIERS

| Qualifier | Types | Description |
|---|---|---|
| Market Direction | BUY | Indicates the intention to initiate a purchase or offset a short position. |
| | SELL | Indicates the intention to initiate a sale or offset a long position. |
| Quantity | Value | Indicates the quantity to purchase or sell. Subject to other qualifiers, any unsatisfied quantity remains in the order book to be matched by an opposing order. |
| Price | LIMIT | Limits the order to be filled at a given price or better. |
| | MARKET | Quantity to be filled should be filled at any available price. If sufficient opposing quantity is available in the order book at time of entry, the order is filled on the available quantity with any balance CANCELLED. |
| Trigger Action | Not Specified | System immediately attempts to find an opposing order which satisfies the order specification. |
| | STOP | Systems delays finding an opposing order until the market trades at the activation price. Requires both a LIMIT parameter and activation price parameter. |
| Duration | Not Specified | Order is retained until the end of day as defined for the contract genus. |
| | FILL or KILL | Order is not retained in the order book. |
| | GOOD UNTIL | Order is retained until the time indicated. |
| | GTC | Order is retained until its full quantity is filled. |
| Status | Not Specified | Order is active in the order book. |
| | FILLED | Order has been satisfied. |
| | CANCEL | Order is removed from the order book. |
| | SYSTEM HOLD | The order remains in the order book, but cannot be matched pending further system action. Used typically for risk management purposes. |
| Special Qualifiers | HIT OR TAKE | Immediately enters an order to purchase (TAKE) or sell (HIT) all the quantity presented as the best-available price. The order is CANCELLED for all unsatisfied quantity if the previous bid or offer price is no longer available at execution time. |
| | ALL or NONE | If insufficient opposing quantity is available in the order book at time of entry, the order is immediately CANCELLED by the system. |
| | ONE CANCELS OTHER | Links several orders together so that the partial or complete satisfaction of any order immediately CANCELS the linked orders. |

Figure 9:
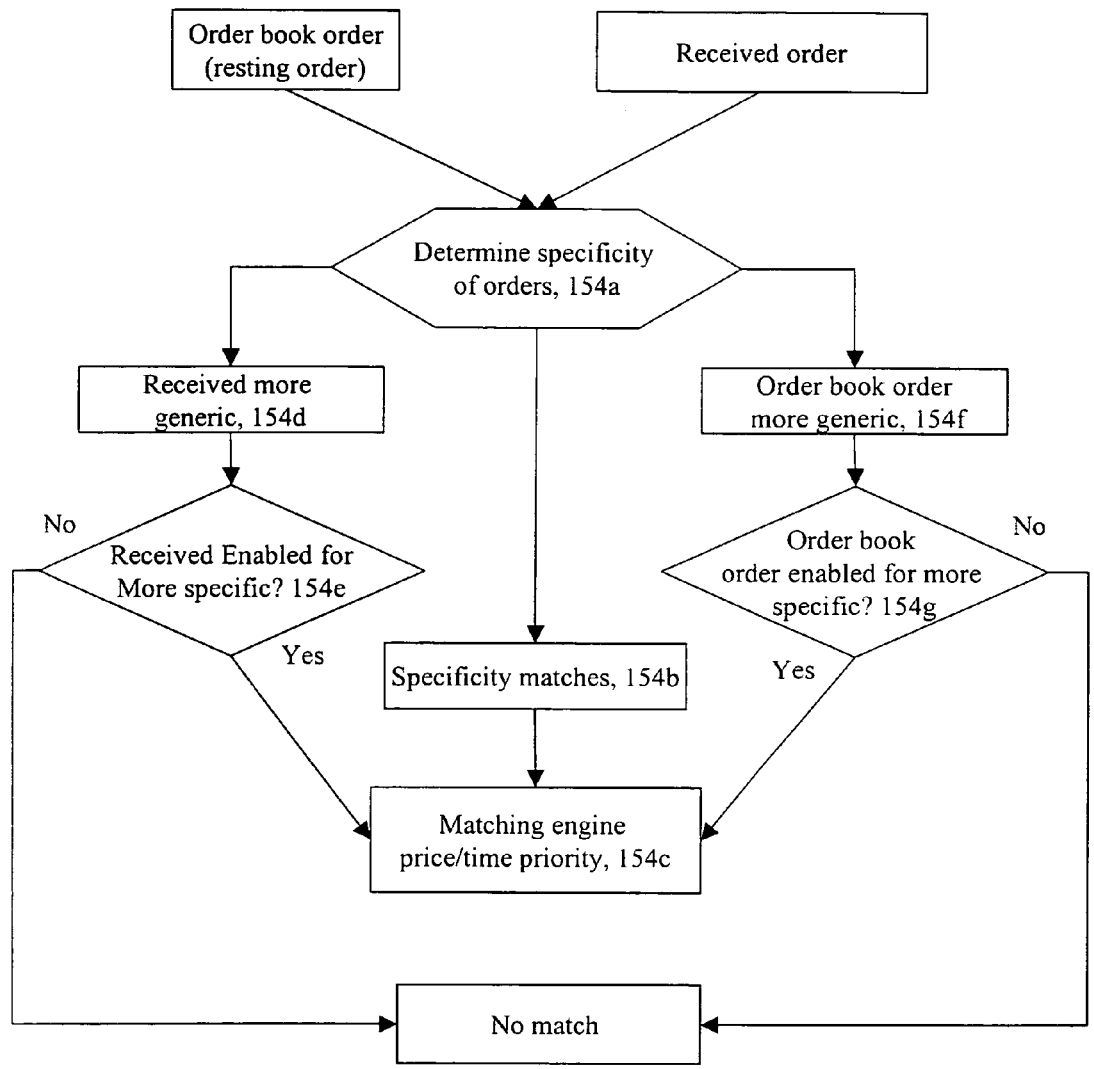
FIG. 9 is a flow chart of a multi-species order matching process.

Referring now to FIG. 9, the matching process 154 determines 154a whether the received order and an order are at the opposite side of the market fetched from the order book have the same level of specificity. If the orders have the same level of specificity 154b, the orders are passed to a conventional matching process 154c to match the order in accordance with price time priority as would be currently performed on a typical futures market exchange. However, if the process 154 determines 154a that the received order is more generic than the order from the order book 154d, and further determines 154e that the received order is enabled for more specific matching, then the received order will be sent to the matching process 154c to match positions with the order from the order book. If orders match 154f, the positions are recorded in each trading account 18 with the degree of specificity on the order that was in the order book and the match is returned 154g. If the orders do not match, the received order will be tested 154f against other orders in the order book as above. If the orders in the order book do not match the received order, the received order will be placed in the order book, as described above, in accordance with time price priority considerations described below.

If the process determines 154a that the received order is more specific (e.g., the order book order is more generic) than the queued order in the order book, the process will determine 154h whether the queued order is enabled 154i for more specific matching. If the queued order is enabled for more specific matching the orders are sent to the matching engine 154c. If there is a match, the positions are recorded in each trading account 18 associated with the orders, with the degree of specificity as set forth on the received order. Otherwise, if there are no orders that match the received order, the received order is placed in the order book.

Each contract genus can use either a price-time or pro-rata order-matching algorithm to find matching, offsetting orders. Trades are executed at the best available price. If there are multiple orders at the same price, the earlier-posted order has priority. Orders are entered into a contract genus order book. If the order contains all the elements necessary to completely define a contract species then it is a candidate for matching with an offsetting order at the other side of the market. For example, a trader 16 can place an order for benzene futures as specified in the example in above. If the trader 16 places the order to include all of the Grade (e.g., astm 2359), Delivery Location (e.g., Houston), and Delivery Month (e.g., July 2000) parameters it would be considered fully specified. Such an order could be matched against an offsetting order that referred to the same set of fully specified parameters. Orders matched in this manner are analogous to the procedures used in conventional futures order matching.

TABLE 3

MULTI-SPECIES ORDER MATCHING RULES

| Activating Order is: | Resting Order is: | Resulting Match and System Behavior |
|---|---|---|
| Same Specificity | Same Specificity | The orders are matched. Each position is recorded in each trading account 18 with the degree of specificity on both orders. |
| More Generic | More Specific | If the activating order is more generic and enabled for 'more specific matching', then orders are matched and positions recorded in each trading account 18 with the degree of specificity on the resting order; otherwise activating orders are placed in the order book. |
| More Specific | More Generic | If the resting order more generic and enabled for 'more specific matching', the orders are matched and positions recorded in each trading account 18 with the degree of specificity on the activating order; otherwise activating orders are placed in the order book. |

In addition to single contract species matching, the matching algorithm supports matching orders across contract species. Multi-species order matching rules are shown in TABLE 3. Such an order can be entered into the contract genus order book, without all the elements necessary to completely define a contract species. Again, consider that a trader 16 can place an order for Benzene as specified above. If the trader 16 places the order to include the Grade (e.g., astm 2359) and Delivery Month (e.g., July 2000) parameters, but indicates the Delivery Location as ANY, it would NOT be considered fully specified. This order could be matched against an offsetting order that also contained ANY as the Delivery location parameter.

The exchange 10 allows a trader 16 to specify that an order be matched against more specific orders. In the example considered here, either the Houston or Corpus Christi delivery points, if specified on the contra-order, could be deemed acceptable matches. Multiple and cross contract species matching impacts position offset rules. If a trading account 18 has both specified and unspecified positions in it, position offset will depend on whether the long or short is more highly specified, and whether the long or short determines actual delivery terms.

Figure 9A:
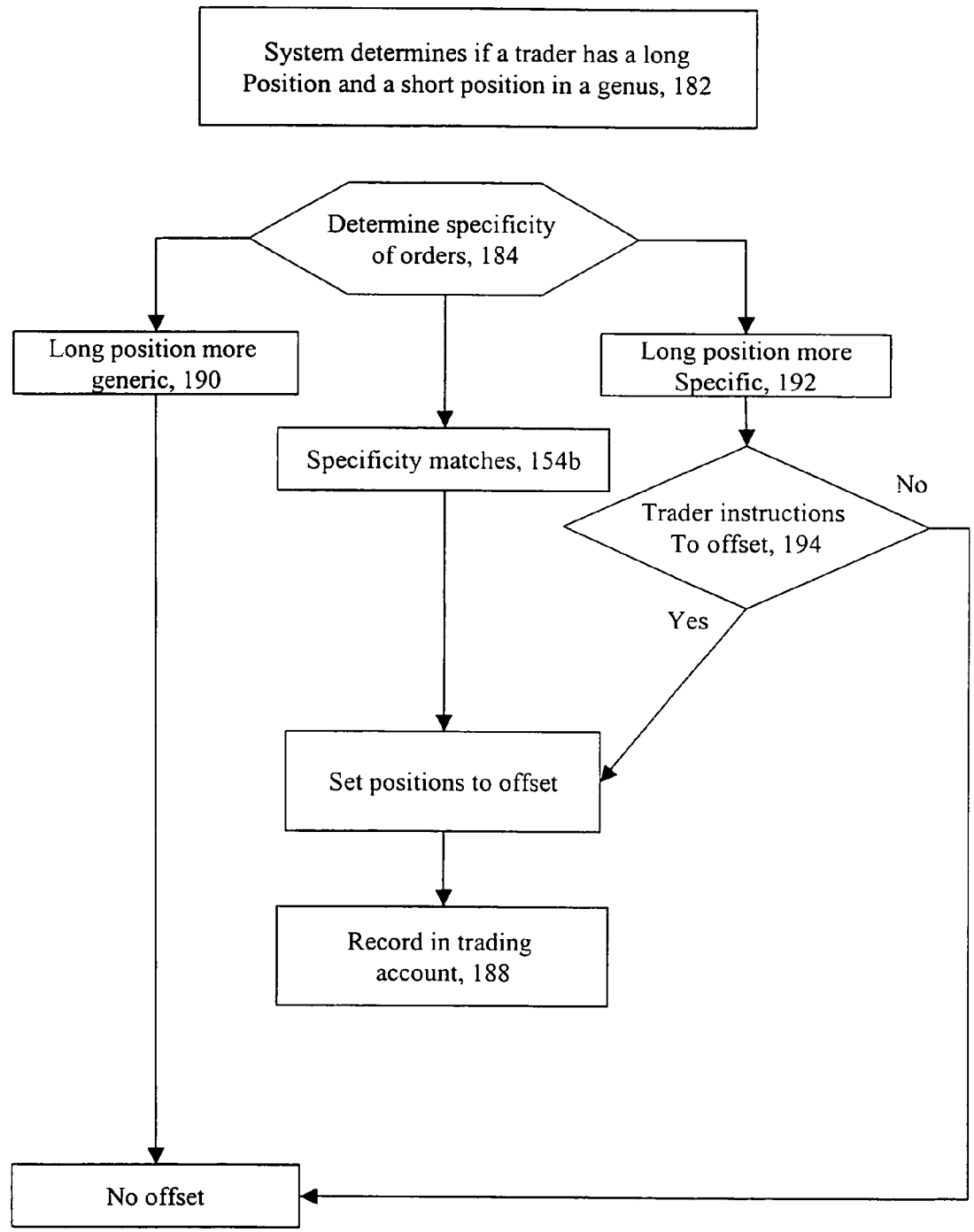
FIG. 9A is a flow chart of a multi-species order offset process.

Referring now to FIG. 9A, a position offsetting process 180 is shown. In this example, the process 18 assumes that the short interests sets unspecified contract terms at the time of contract delivery. The position offsetting process 180 is used to offset positions from a common trader 16 or a common subscriber in a common market. The position offsetting process 180 determines 182 whether the subscriber has a long position and a short position in the market. The process also determines 184 the relative specificity of the positions. If a long position in a market has the same specificity 186 as a short position in the market, and if so, the positions are set 186 to offset and the offsetting positions are recorded 188 in the trading account 18 of the trader 16. If the long position is more generic than the short position 190, the positions will not offset since the exchange cannot determine that the remaining positions will result in a correct match between short and long positions at delivery time. However, if the long position is more specific 192 than the short position, the positions will offset upon trader instruction 194 since the exchange 10 can be certain that the remaining positions will result in a correct match between short and long positions at delivery time. TABLE 4 shows offset rules.

TABLE 4

MULTI-SPECIES POSITION OFFSET RULES*

| Long Position is: | Short Position is: | Resulting Offset |
|---|---|---|
| Same Specificity | Same Specificity | Positions offset. |
| More Generic | More Specific | No offset. Exchange 10 cannot be certain that the remaining positions will result in a correct match between short and long at delivery time. |
| More Specific | More Generic | Positions offset upon trader instruction. Exchange 10 can be certain that the remaining positions will result in a correct match between short and long at delivery time. |

The Exchange 10 can permit certain trades to be matched away from the exchange 10 order book. In particular EFPs, Block Trades, and other adjustments can be posted to the exchange clearing system without passing through the exchange's matching engine. Exchange of futures for physicals (EFPs) and block trades are particular trades that can be done outside of the trade matching system, but which are entered into the trading system after they take place. Both parties to the trade report an EFP or block trade to the exchange 10 so that open interest and position information can be updated accordingly. The exchange 10 verifies that sufficient assets are available in each subscriber's trading account 18 before allowing the trade to be cleared.

An ex-pit is a notification of a change to an already cleared trade. Changes may include the subscriber to whom the trade was attributed; the price at which the trade was executed; or the quantity traded. Both sides of the original trade need to agree to price and quantity changes. EFPs, ex-pits and block trades are recorded as special trade types. Ex-pits transactions generally are not broadcast to the entire market. The exchange compliance system monitors these trades to ensure that they comply with exchange rules.

Confirmation messages are generated upon order entry and execution. The Exchange 10 can electronically deliver messages via, E-mail, fax, beeper, personal assistant, etc. The messages are sent to the executing trader 16 and to the subscriber for whom the order was placed. Messages may be sent to the guarantor or others upon request.

Orders may be modified prior to being matched. If an order is modified, it loses its position in the order book unless the modification is to lower the order quantity. Orders may be canceled for any unsatisfied portion before being matched. In certain risk management circumstances, exchange 10 can suspend an order by indicating the order as System Held. Suspended orders remain in the order book, but they are not available for matching. If a held order is reactivated, it retains its original time priority.

Figure 10:
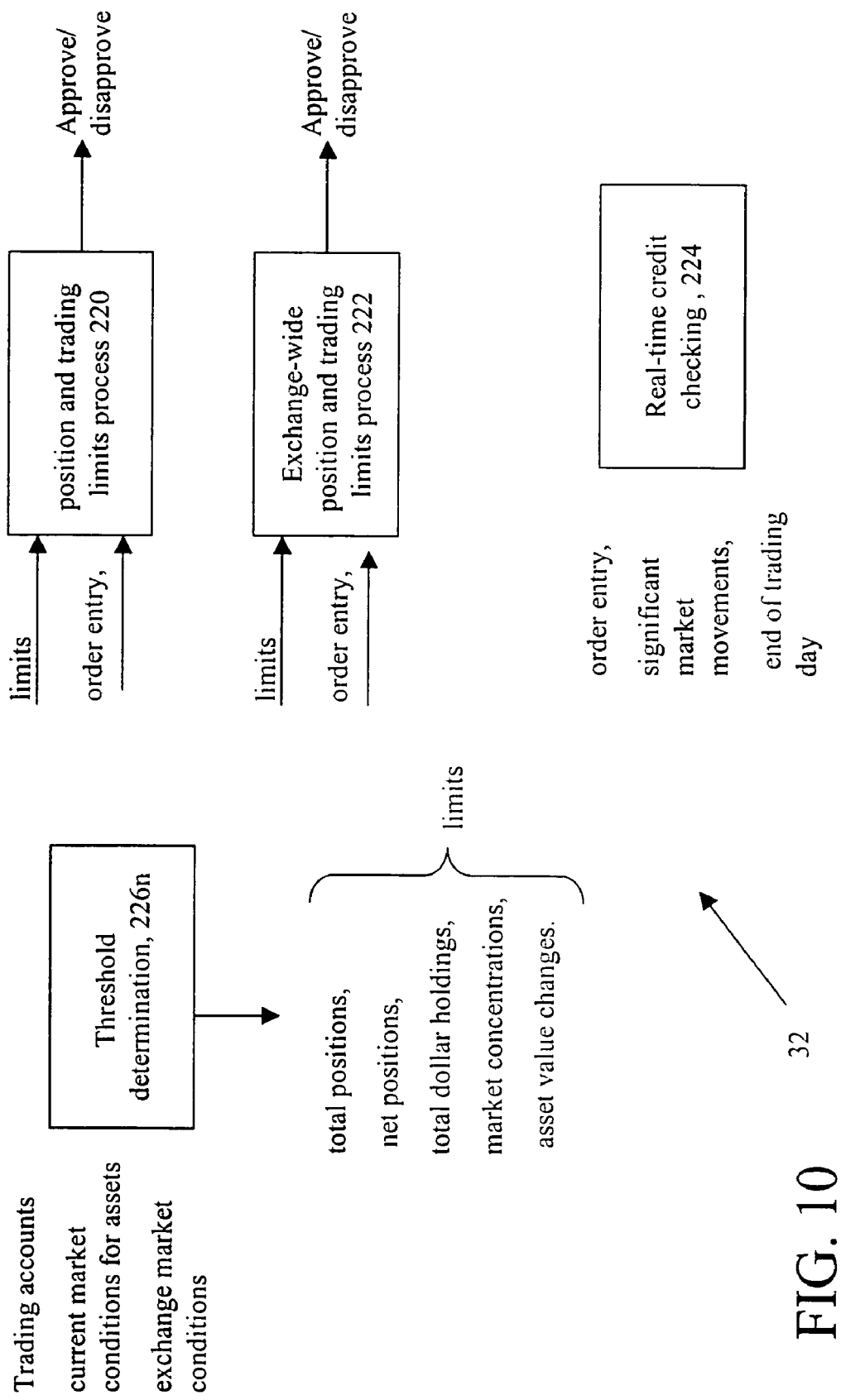
FIG. 10 is a block diagram of details of a risk management system.

Referring to FIG. 10, the exchange 10 includes a risk management system 32 to minimize the incidence of credit-induced financial losses, contain losses once they are identified, and ensure continuous market function and financial integrity. The risk management system 32 minimizes the likelihood that a particular subscriber will fail to meet its obligations to the exchange 10. The risk management system 32 includes a system-enforced position and trading limits process 220 that covers all traders 16 acting on behalf of a subscriber. These limits can be set by the subscriber, the guarantor, or by the exchange 10. The integrated risk management also includes system-enforced position and trading limits process 222 that covers all subscribers 12 and may be triggered by monetary deficiencies, 222a positions at or above the limits set for that entity, 222b or other conditions 222c. In addition, the risk management system includes a real time or near-real-time credit checking process 224 that checks subscriber positions and available assets. The credit checking process 224 verifies credit, positions and available assets at order entry, upon significant market movements, and at the end of every trading day.

The exchange 10 measures risk in a number of ways. Thresholds for various risk parameters are set 226 for each trader 16 and each subscriber. There are default thresholds that may be changed for each and every entity at the discretion of the exchange 10. Thresholds include total positions, net positions, total dollar holdings, market concentrations, and asset value changes. Risk fluctuates several ways for a given trading account. For example, positions held in the account may change in value, the assets held in the account may change in value, and the exchange 10 may increase margin rates, which will require additional funds to be deposited.

To minimize large fluctuations in parameters, and thus large movements in risk, the exchange 10 measures each of these conditions independently at regular intervals (e.g., daily, hourly, upon limit price move, etc.). The risk system 32 revalues 228 assets on account, marks-to-market the positions 230 in each trading account, determines 232 the profit and loss of current trading, and recalculates 234 the margin requirement of the subscriber's portfolio. A comparison 236 is made of the asset value in the account versus the required margin, and, when a deficiency occurs 238, the exchange 10 requires additional assets of the subscribers 12. To limit the losses that arise from the inability of a subscriber to perform (e.g., pay for trades, cover margin deficiencies, or delivery default), exchange 10 can establish an initial margin, e.g., at least twice the daily limit move permitted for each contract species.

Asset valuation also includes a capital charge process 236 that reflects both the cost of liquidating the asset, and the possible value changes such assets may incur before they can be sold. When a deficiency is noted in an account (i.e., required margin exceeds asset value), the subscriber will be asked to increase the asset value in the account.

Figure 11:
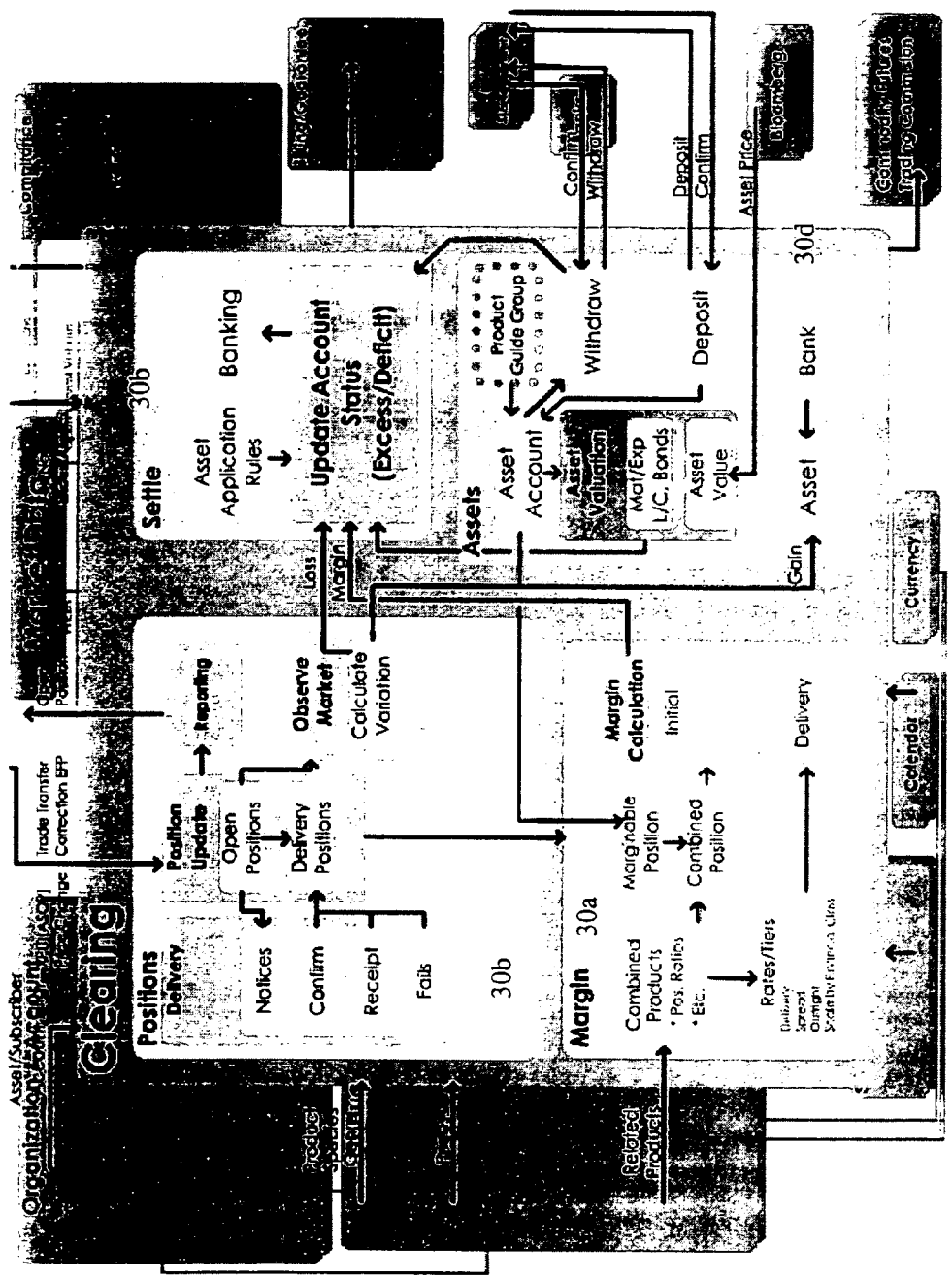
FIG. 11 is a block diagram of details of a clearing system.

Referring to FIG. 11, the exchange 10 clears and settles every transaction and serves as the counterpart to every trade. The exchange clearing and settlement system 30 is a fully integrated processing engine for exchange clearing and settlement functions. The exchange 10 uses different margin protocols 32*a*. For example, a conventional cash-based margin protocol can be used. The exchange 10 can also use an Asset-based protocol, as discussed below. The protocol used is determined by the contract genus. The Asset-based Margin Protocol (AMP) replaces daily pays and collects of margin that occurs with the cash-based protocol, with asset verification at the subscriber and guarantor levels. The Asset-based Margin Protocol can reduce the costs of participating in futures markets without compromising risk management.

The clearing system 30 includes a settlement engine 30*b* that performs a full settlement run 250 daily, after cessation of trading. The clearing system 30 also includes an engine 30*c* to determine positions of all subscribers on a periodic basis as well as those of subscribers during trade clearing. The clearing function also includes an asset valuation/deposit engine 30*d* that updates asset values in relation current market conditions for use with margin requirements and manages deposit and withdrawals of assets.

Exchange clearing and settlement systems 30 provide constant, real-time gross and net financial data. The exchange 10 system automatically marks-to-market all open positions. The clearing system 30 determines margin. With a cash margin protocol, at the end of every day, the system sends to subscribers 12, their depository or guaranteeing banks, as the case may be, and/or to their FCMs their debits and/or credits, and the resulting balances in, each subscriber's account. In the CMP, position information is disseminated and each subscriber or its guarantor will make or receive daily pays or collects. These transfers will take place through the exchange depository bank. In the AMP, position information will be disseminated, but no daily pays or collects will take place so long as sufficient assets are already identified. Subscribers 12 or their guarantor will be required to make payment or provide evidence of additional assets when a subscriber needs to meet new margin obligations.

As soon as any portion of an order is filled, the position for that subscriber is posted to the trading account 18 indicated by the trader 16 on the order. When the contract species can result in an offset, the trade is liquidated with any resulting credit or debit identified as a realized gain or loss in the subscriber's trading account. In addition to trade posting, positions may be altered by making or taking delivery of the underlying product, accepting cash delivery for the position, or executing an exchange-for-physical against the position. These alterations will trigger position adjustments and are treated by the clearing system 30 as though the trades were matched through the exchange matching engine.

Assets may be placed in or released from a subscriber's trading account 18 at any time provide that a release will not bring assets below a required margin amount. Assets will be recorded in face amounts (when appropriate), and in equivalent value to reflect the capital charge applied to each asset. An asset inventory will be maintained for each trading account. Assets may be limited to covering a single contract genus or a specific delivery commitment, or may be applied across multiple products. When determining a subscriber's excess or deficiency, more restricted assets will be applied first against their allowable contract genus, and then less restricted assets will be applied.

An initial margin can be set at a minimum of two times the daily price limit move for each contract species held in a subscriber's trading account 18. A variation margin will be calculated at least daily and applied to the subscriber's trading account. For contract genera that employ the Asset-based Margin Protocol, the margin maintenance is set at 100% of the initial margin rate as sufficient assets must always be available. Contract genera that employ the CMP will have maintenance margin levels set at 75% of initial margin rates.

Figure 12:
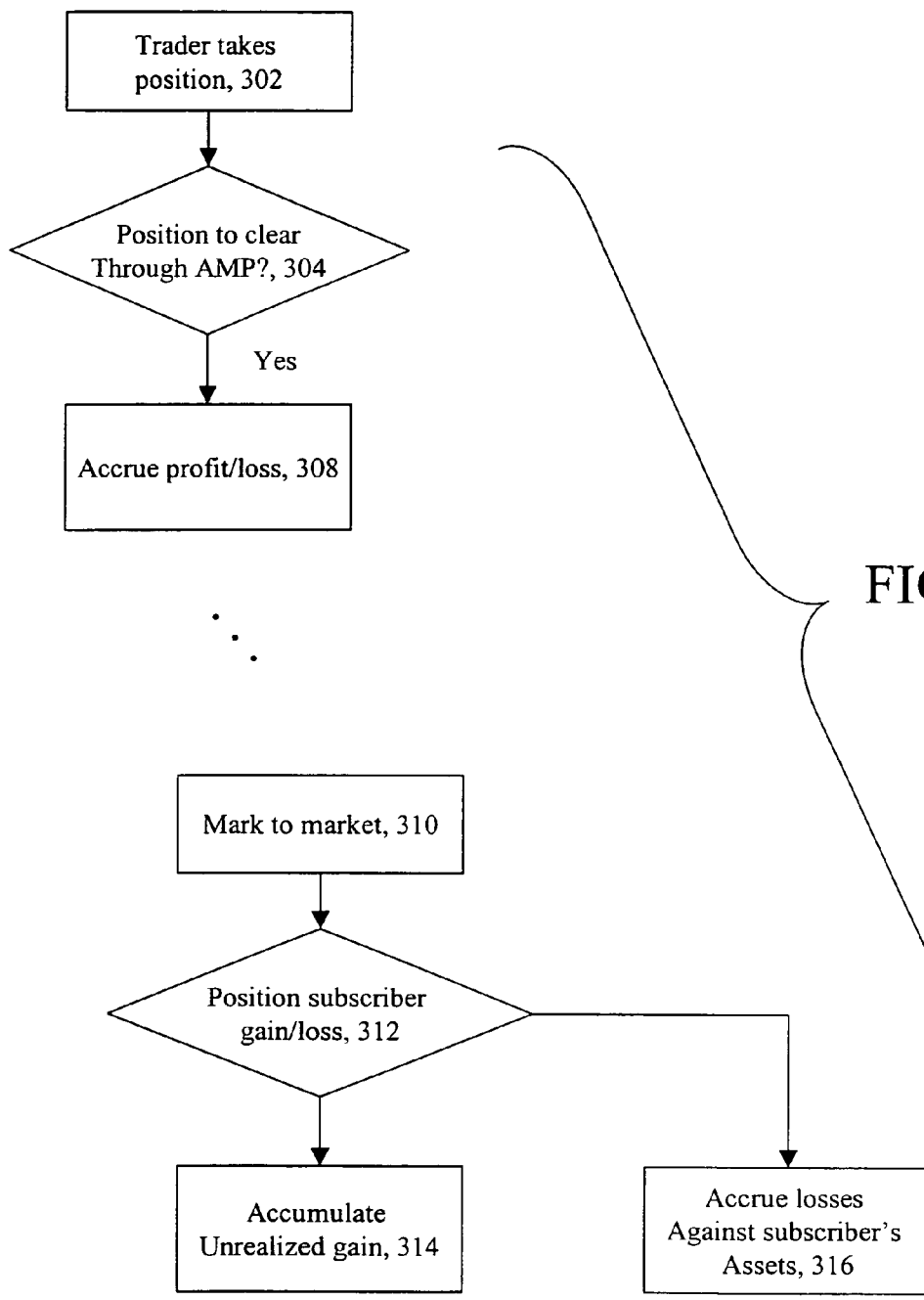
FIG. 12 is a flow chart of an asset-based margin protocol.

Referring to FIG. 12, an asset-based margin protocol process 300 is shown. A trader 16 takes 302 a position in a contact. If the contract genus is defined as clearing through the asset-based margin protocol 304, any profits that accrue while the position is still open are posted as assets in the trading account 18 as an unrealized gain. The unrealized gain can be used to trade with. The profit is obtained when the position is closed out, or at contract termination. As long as the contract position is open, the trading account 18 is debited with losses or credited with gains 308. The asset-based margin protocol differs from the typical futures market, which uses a cash-based margin protocol. In a cash-based margin protocol money moves from account to account among financial institutions.

At any time during the day or at least twice a day, there is a mark to market done 310 against a position. With an asset-based protocol the subscriber determines 312 if there is an unrealized gain or a loss. With asset-based margin protocol, the system does not make routine daily pays and collects. Rather, the system accrues 316 net unrealized losses against a subscriber's assets or credits unrealized gains 316. The exchange 10 can make on-demand requests for cash payment of either or both initial margin and unrealized losses (i.e., accrued variation margin) against the subscriber's assets at any time. The system will also make demand payments for realized losses at time of position offset, and permit a subscriber to use net unrealized gains to reduce or withdraw other assets in the trading account. The system will make payments for realized gains at time of position offset, but such payments are only guaranteed at time of contract expiration.

For example, XYZ Corp., a mid-size corporation, wishes to hedge using exchange 10 benzene futures. The company has secured a letter of credit ("LC") from its bank for the benefit of exchange 10 that entitles XYZ to maintain a position of up to $100,000 in benzene futures. At an initial margin rate of $0.40 per gallon, this credit amount translates to a maximum initial position of 250,000 gallons. The trader 16 for XYZ Corp. purchases futures on 100,000 gallons of benzene at a price of $2.00 per gallon. Exchange 10 notes in XYZ's trading account 18 that $40,000 from XYZ's letter of credit is allocated to initial margin. With the asset-based margin protocol, exchange 10 does not draw upon the letter of credit. Subsequently, the trader 16 exits the position at $1.90. Exchange 10 advises XYZ that the unrealized loss of $10,000 is due and payable and notes in the XYZ trading account 18 that $30,000 of the letter of credit is again available. Upon receipt of $10,000, the full value of the LC is available to XYZ Corp.

ABC Corp., another mid-size corporation, also wishes to hedge using exchange 10 benzene futures. The company has deposited $50,000 cash with exchange 10. At an initial margin rate of $0.40 per gallon, this translates to a maximum initial position of 125,000 gallons. The trader 16 for ABC Corp. purchases futures on 125,000 gallons of benzene at a price of $1.50 per gallon. Exchange 10 notes in ABC's trading account 18 that $40,000 is allocated to initial margin. Subsequently, the market rises to $1.70. ABC's unrealized gain now equals $20,000. Exchange 10 will advise ABC that it may now withdraw up to $20,000 from the ABC trading account, which is equal to the $20,000 unrealized gain now in that account.

AMP differs from the Cash-based Margin Protocol (CMP) in that daily pays and collects of margin differences are not made. Instead, subscriber assets provided through the subscriber's guarantor are made available to the exchange 10 on demand. All other components of the exchange 10, e.g., risk management system and clearing systems are identical for both margin protocols. The exchange 10 provides direct access to subscribers 12. The Asset-based Margin Protocol (AMP) eliminates cumbersome daily pay and collect procedures that would occur in a cash-based margin protocol.

Exchange 10 performs an end of day settlement run for each contract market. Positions are marked to market, trading profit and loss are computed, and total profit and loss amounts are determined for each trading account. These amounts are added to (in the case of profits), or subtracted from (in the case of losses), the asset value in the trading account 18. This process will precede margin calculations so that the true asset value, including accumulated profit and loss, can be used to compare against requirements to establish an excess/deficit indication.

At any time during the day, a profit-and-loss computation can be performed. It can be applied to an individual contract genus, to all contract genera, or just selected subscribers 12. Similarly, it can be applied to any or all trading accounts. Anytime a settlement is performed the trading accounts are updated with the results and the system marks the event. Subsequent settlements are performed by marking to market from the previous mark to the present. When a trade is made, if it is on the same side of the market as an existing position in the trading account, or if there was no pre-existing position, it considered new business and open interest increases by the trade quantity. If in the trading account 18 position already exists on the opposite side of the market, the position is reduced. If the trade quantity is larger than the existing position, the position will switch sides of the market with the resulting position equal to the difference between the originally existing position and the trade quantity. At the close of trading on the last trading day, a full pay/collect will be performed for all open positions in the expiring contract. All open accounts will be closed and balances will be transferred through the exchange 10 to the bank accounts of the subscribers.

Any trading account 18 having a position at the termination of trading for a contract species will be required to make (if short) or accept (if long) delivery. All positions require that delivery margin requirements are met by the assets in the trading account 18. The pay and collect process will be performed for both cash delivered and physically delivered products (see contract termination). For physically delivered products, sellers (deliverers) and buyers (receivers) are matched using algorithms specific to the contract genus. The following functions are recorded by the exchange 10.

The receiver indicates that money has been sent. The deliverer indicates that the good have been sent. The deliverer indicates that the money has been received. The receiver indicates that the good have been received and are in proper order. When these four items have been completed, the system marks the positions as delivered, and releases the delivery margin.

Defaults

The system 11 handles defaults by a member, e.g., subscriber. Any of the following events can result in a default by a subscriber 12. For example, a subscriber 12 can fail to meet any of its obligations under its Contracts with the exchange. Such defaults occur when a subscriber 12 holds a short contract position and does not tender a delivery notice or holds a long contract position and does not accept delivery or does not make full payment when due. These are examples of monetary defaults. Other monetary defaults include failing to meet minimum margin obligations and so forth. Other types of default events include commencing a voluntary or a joint case in bankruptcy or filing a voluntary petition or an answer seeking liquidation, appointment of a custodian, liquidator, conservator, receiver or trustee, making an assignment for the benefit of creditors or becoming or admitting that it is insolvent. In addition, an involuntary case of bankruptcy or an involuntary petition would be a defaulting event.

To secure the exchange and its other participating subscribers 12 from financial exposure, the defaulting subscriber 12 is automatically suspended. The suspension may be temporarily postponed by an official of the exchange, e.g., the President, if the official determines that such suspension would not be in the best interests of the exchange.

Figure 13:
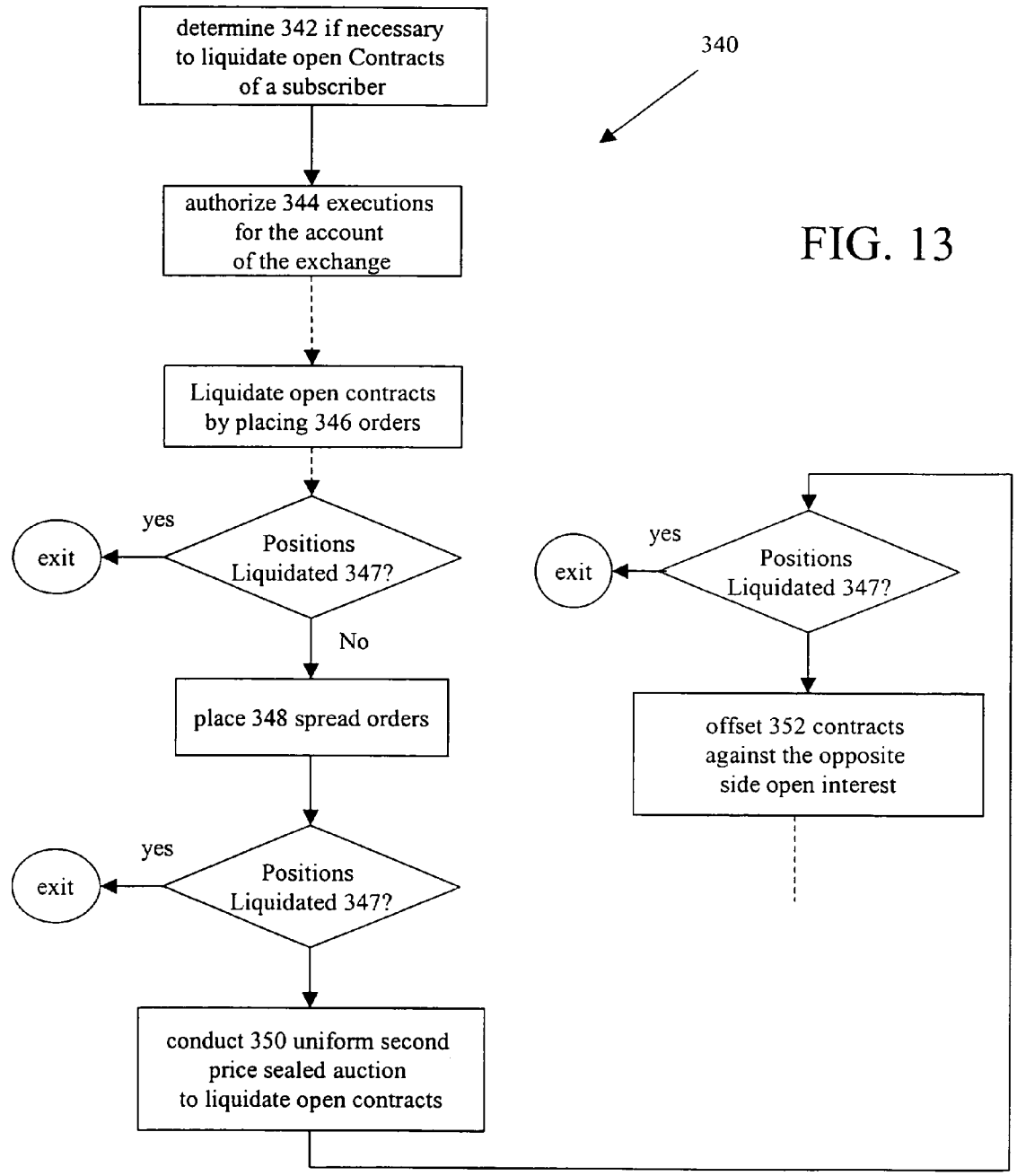
FIG. 13 is a flow chart of a liquidation process for defaults.

Referring to FIG. 13, the system 11 includes a liquidation process 340 to close out a position upon termination or suspension of a subscriber 12. When an entity ceases to be a subscriber 12 or is suspended all open contracts carried in the system for subscriber 12 are liquidated, as set forth below. The liquidation process 340 occurs as expeditiously as practicable. There are situations where the default process need not be used since the protection of the exchange does not require the implementation of the default process 340. For example if open contracts are transferred to and accepted by one or more other subscribers 12, with the consent of the exchange or the official determines that the protection of the financial integrity of the exchange does not require such a liquidation; or such liquidation is delayed because of the cessation or curtailment of trading on the exchange for such contracts.

The liquidation process 340 determines 342 if it is necessary to liquidate any open Contracts of a subscriber. If necessary, the exchange proceeds to liquidate the positions of the defaulting subscriber. If the exchange is unable for any reason to liquidate the open contracts in a prompt and orderly fashion, the official of the exchange may authorize 344 the executions from time to time for the account of the exchange, solely for the purpose of reducing the risk to the exchange resulting from the continued maintenance of such open contracts. The official can hedge transactions, including, without limitation, the purchase, grant, exercise or sale of contracts The defaulting subscriber remains liable to the exchange for any commissions or other expenses incurred in liquidating such contracts. The open contracts are liquidated by placing 346 orders for the purchase, grant, exercise, or sale of contracts within the trading system 11, subject to the rules of the market for the contract.

The liquidation process 340 includes other techniques to close out the positions of the defaulting subscriber. The liquidation process 340 can place 348 spread orders for any combination of contracts other than the liquidation contract within the trading system 11 and subject to the rules of the respective contract markets, conduct 350 a uniform second price sealed auction to liquidate open contracts. The liquidation process can offset 352 such contracts against the opposite side open interest on a last-in first-out basis at a price equal to the settlement price on the day such liquidation is ordered or at such other price as the Board may establish. This offset effects mutualization of risk among market participants in this manner allows for orderly disposition of the defaulting subscriber's positions and allows the exchange to operate with minimal capital reserves for handling defaults.

If an order for relief has been entered with respect to the defaulting person, the exchange will not effect any such liquidation by book entry except as may be permitted by governmental regulations. Any liquidation may be effected without placing orders for execution into the trading system 11, by making appropriate book entries on the records of the company (including, without limitation, by pairing and canceling offsetting long and short positions). If it is not possible to liquidate all net open contracts the company may liquidate such contracts by taking opposite positions in the current expiration month for the account of the defaulting subscriber 12 and liquidating the resultant offset positions by a spread. All liquidations are for the account and risk of the defaulting subscriber.

Payments in the Event of Default

The original margin of the defaulting subscriber 12 and any of its other assets or credit facilities under the control of the exchange are liquidated and applied by the company to pay the amount owing (the "Defaulted Obligation"). If the margin and other assets or credit facilities of the defaulting subscriber 12 under the control of the company are in the aggregate less than the defaulted obligation, and if the defaulting subscriber 12 fails to pay the company the amount of the deficiency on demand, such defaulting subscriber 12 continues to be liable for the deficiency.

The amount of the deficiency, until collected from the defaulting subscriber 12, is met from various sources. For example, one set of sources of funds can be a loan on such terms and conditions as the president may determine to be necessary or appropriate; a guaranty fund or insurance proceeds, if any, received by the company in connection with the event of default giving rise to the defaulted obligation; and a surplus, if any, of the exchange as the Board determines in accordance with the Bylaws to be available for such purpose. The sources can be in a listed order with each such source being fully exhausted before the next following source is applied.

Figure 14:
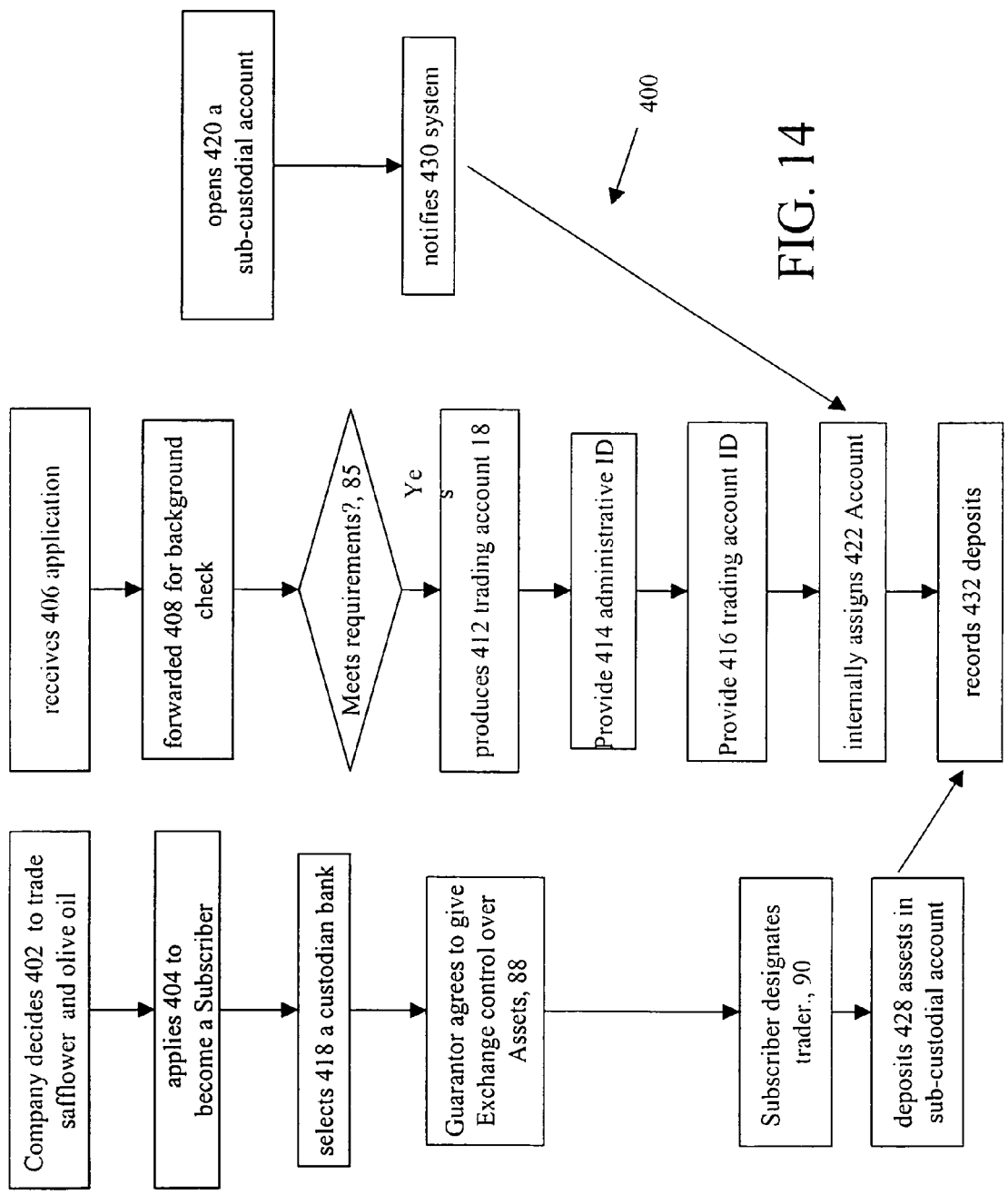
FIGS. 14-16, 17A, 17B are flow charts of exemplary processes used in the market.

Referring to FIG. 14, an example 400 of the exchange process used in system 11 is shown. Company Inc. decides 402 to trade safflower and olive oil futures on system 11. Its CEO applies 404 to system 11 to become a Subscriber. Company Inc.'s head oil trader, is designated 404 by Company Inc., as its authorized trader. System 11 receives 406 Company Inc.'s application, which includes its designation of a trader. The names of Company Inc., Subscriber, and Trader are forwarded 408 to the NFA for a background check by NFA. NFA also verifies that Company Inc. is an eligible swap participant based on Company Inc.'s financial statements and databases (e.g., Dun & Bradstreet). With NFA's check and Company Inc.'s subscriber agreement complete, system 11 produces 412 a trading account 18 for Company Inc. An administrative user ID and password are provided 414 to Subscriber. Administrative accounts do not have trading privileges. A trading account user ID and password are provided 416 to Trader. Although Company Inc., Inc. has a trading account 18 at system 11, Trader may not enter trades because the company has not opened an account with a custody bank.

The subscriber selects 418 a custodian bank from a list of approved financial institutions (AFIs). The custodian bank opens 420 a system 11 sub-custodial account for the benefit of Company Inc. After receiving a signed account agreement from Company Inc. and verification from custodian bank, System 11 internally assigns 422 the Account at custodian bank to the Company Inc. trading account 18.

Subscriber uses a secure Internet connection to system 11 to authorize Trader to enter trades for the trading account 18. Although an Trading account 18 has been provided and Trader has been authorized to trade, system 11's trading system prohibits Trader from entering trades because the Account has no assets to cover original margin.

As an internal control, Subscriber restricts Company Inc.'s trading activity to the safflower and olive oil markets. Furthermore, Subscriber decides that Trader should be constrained to trading 20 or fewer contracts per day and a position limit of 20 contracts. Subscriber uses the secure Internet connection to system 11 to establish these controls.

Subscriber deposits 428 assets in the sub-custodial account e.g., six Treasury bills of $10,000 each and $5,000 in cash in the sub-custodial Account. Custodian bank notifies 430 system 11, e.g., by fax or other manner that the six T-Bills and cash have been placed in the Account. The notification includes a description of each asset e.g. face value, CUSIP number, expiration date, issue date, denomination, and so forth.

System 11 records 432 these deposits using a clearing administrative screen for asset deposits. The records in the system 11 always reflect the assets in the account as verified by custodian bank in its custodian bank capacity. Subscriber also arranges for an irrevocable Letter of Credit (L/C) to be provided by Bank for Company Inc.'s positions at system 11 in the amount of $50,000. The L/C provides that it can be used only to support margin requirements for Company Inc.'s trading in safflower or Olive Oil contracts. Subscriber notifies system 11 of the L/C and stipulates that the L/C is associated with the same Trading account 18 that Company Inc. previously funded at custodian bank so that the total amount of Margin Eligible Assets in that trading account 18 is $115,000 ($60,000 T-bills, $5,000 cash, $50,000 L/C). System 11 receives the L/C from Bank and adds the L/C amount, less an L/C "haircut", to the Trading Account "assets" of Company Inc. Trading may now take place.

Figure 15:
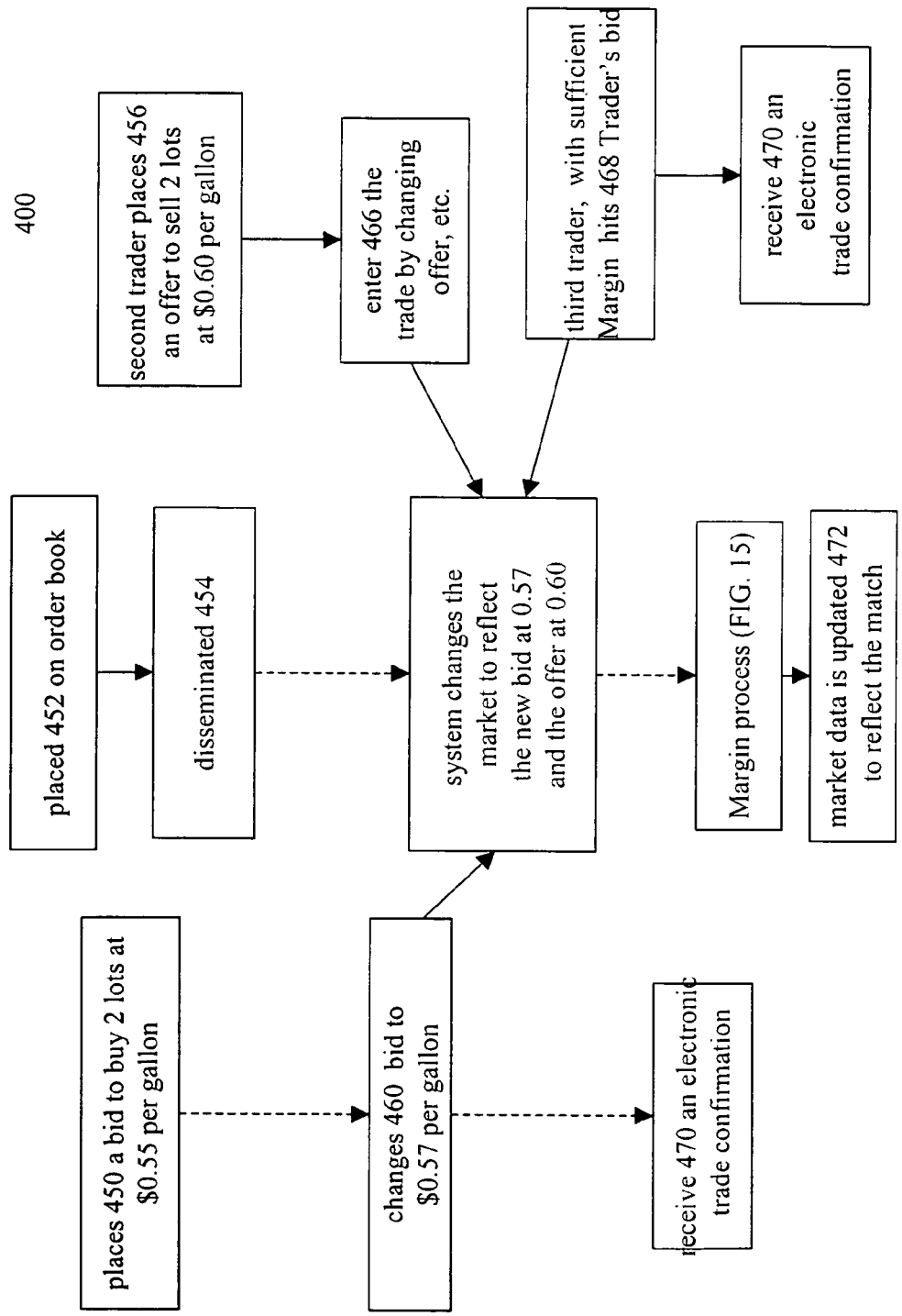

Referring to FIG. 15, the system 11 will approve Trader's orders subject to the constraints placed by Subscriber's administrative limits and original margin availability.

Trader places 450 a bid to buy 2 lots of safflower Oil futures for a delivery date of Sep. 29, 2000. The trader is willing to take delivery at "Any" location and in "Any" container type. The trader is willing to pay up to $0.55 per gallon. (Contract specifications are shown in TABLE 4 below.) This limit buy order is placed 452 on the order book at system 11 and is disseminated 454 to all market participants. The order displays price and quantity.

A second trader (already enabled to trade) places 456 an offer to sell 2 lots of Company Inc. oil futures for delivery on Sep. 29, 2000, with additional parameters of New York delivery in 10-gallon cans. The asking price is $0.60 per gallon. Because second trader is willing to take delivery in New York and in 10-gallon containers, the second trader's bid is also displayed 458 on the order book. This is also a limit order, but on the sell side of the market. All market participants see that the market for safflower Oil, New York delivery, 10-gallon cans is bid $0.55 and offered at $0.60. Company Inc.'s order would appear on any order book for Company Inc. oil futures for delivery on Sep. 29, 2000 with a more specific delivery location or container specification.

Trader decides to increase the offer to $0.57. The trader does this by changing 460 the original offer. System 11 treats price changes as a Cancel/Replace so Trader's order now reflects the time priority of a new order. Because no one else has a limit order in the system 11 at that side of the market for the same price or better, Trader is still the best bid. If there were other $0.57 bids entered before Trader's change, Trader would be behind them in the time priority queue. The system changes the market to reflect the new bid at 0.57 and the offer at 0.60. At this point the second trader (seller) decides to hit the $0.57 bid. The second trader can enter 466 the trade in a number of ways, e.g., by cancelling and replacing the original order that is either a market order or a limit order at $0.57.

Figure 16:
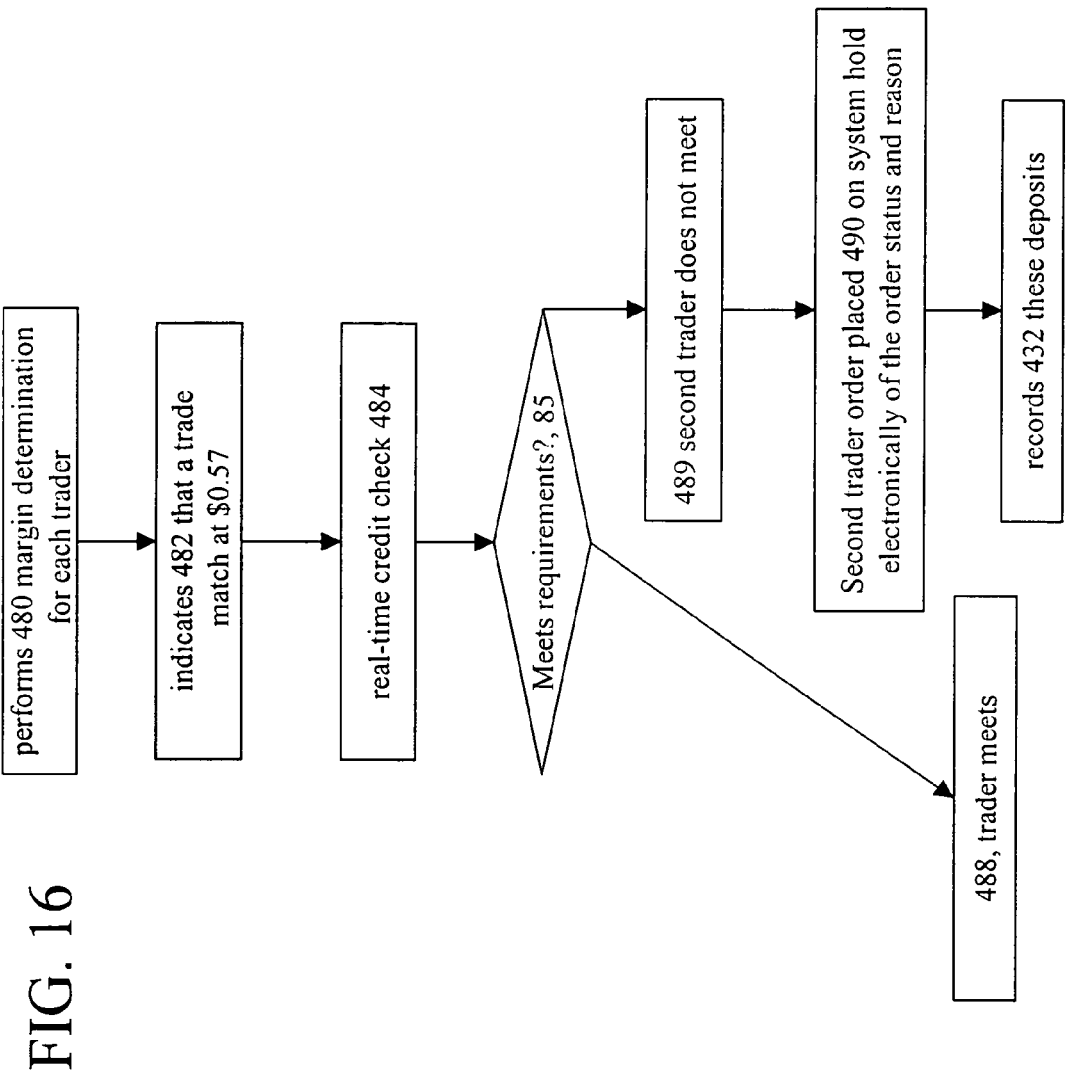

Referring to FIG. 16, the system 11 performs 480 margin determination for each trader. Company Inc. oil futures have an Original Margin of $1,500. Therefore, two lots will produces an Original Margin requirement of 2 times $1,500, or $3,000. The system indicates 482 that a trade match at $0.57 is possible. A real-time credit check 484 is performed to determine whether Company Inc.'s total Original Margin requirement including the result of the new trade is less than the Margin Obligation Eligible Assets identified in the trading account 18. The check is also performed for the other market participant.

Looking at the funds on deposit for Company Inc.'s Trading account 18, the system notes total T-Bill value of $60,000, a $50,000 L/C and cash of $5,000. Since T-Bills have a haircut of 5%, and L/Cs have a 20% haircut. The clearance system 30 produces a total "operating value" of assets equal to $57,000 ($60,000 minus 5%), plus $40,000 ($50,000 minus 20%) plus $5,000 for a total of $102,000. The Company Inc.'s order is eligible 488 to be matched, since the operating value is greater than the Original Margin requirement. Assume for this example that the second trader does not have sufficient margin 489.

If the second trader does not have sufficient Margin Obligation Eligible Assets present at its Custody Bank to support the trade, then no trade can occur between these two parties. The second trader with the insufficient assets has the order placed 490 on system hold and is notified 492 electronically of the order status and reason. Trade compliance staff is also notified of the situation.

Referring back to FIG. 15, another market participant third trader, with sufficient Margin Eligible Assets hits 468 Trader's bid. Both parties receive 470 an electronic trade confirmation. Upon match, market data is updated 472 to reflect the match. The last trade price is updated and current volume count is increased. The match is for the more specific product and information regarding that product is updated. Subscriber sees the following Trading Account statement:

| Cash | 5,000.00 | 5,000.00 |
|---|---|---|
| Governments | 60,000.00 | 57,000.00 |
| L/C | 50,000.00 | 40,000.00 |
| Margin Requirement | | |
| Company Inc. Oil 2 long @$1,500.00 | | ($3,000.00) |
| Less Open Contract Gains | | $20.00 |
| Net Original Margin Requirement | | ($2,980.00) |
| Margin Availability | | $99,020.00 |

The system 11 collects and/or computes the following information for display.

1) Margin Eligible Assets (Cash, Government Securities, Letters of Credit, Foreign Currencies)

2) Any reduction in the Margin Eligible Assets due to haircuts on Government Securities, Letters of Credit, or Foreign Currency amounts.

3) Margin requirements (Original, Delivery)

4) Gains or losses associated with Open positions reflecting any differences between the last mark-to-market and last pay collect.

5) Gains or losses from Closed Contract positions.

For mark-to-market the reference price is determined by the system 11 and may be the last trade price, a computation derived with bids or offers, or external reference prices. All accounts are credited or debited with the amount of the gain or loss. An open contract gain of $20.00 indicates that a mark-to-market occurred since the last pay/collect cycle and that the mark-to-market was in Company Inc.'s favor. Had the pay/collect occurred, then Company Inc.'s cash would show a balance of $5,020.00 and the Open Contract Gains would show a balance of $0. Open Contract Gains may be applied to Margin Availability, but may not be withdrawn from an account.

Settlement

Figure 17A:
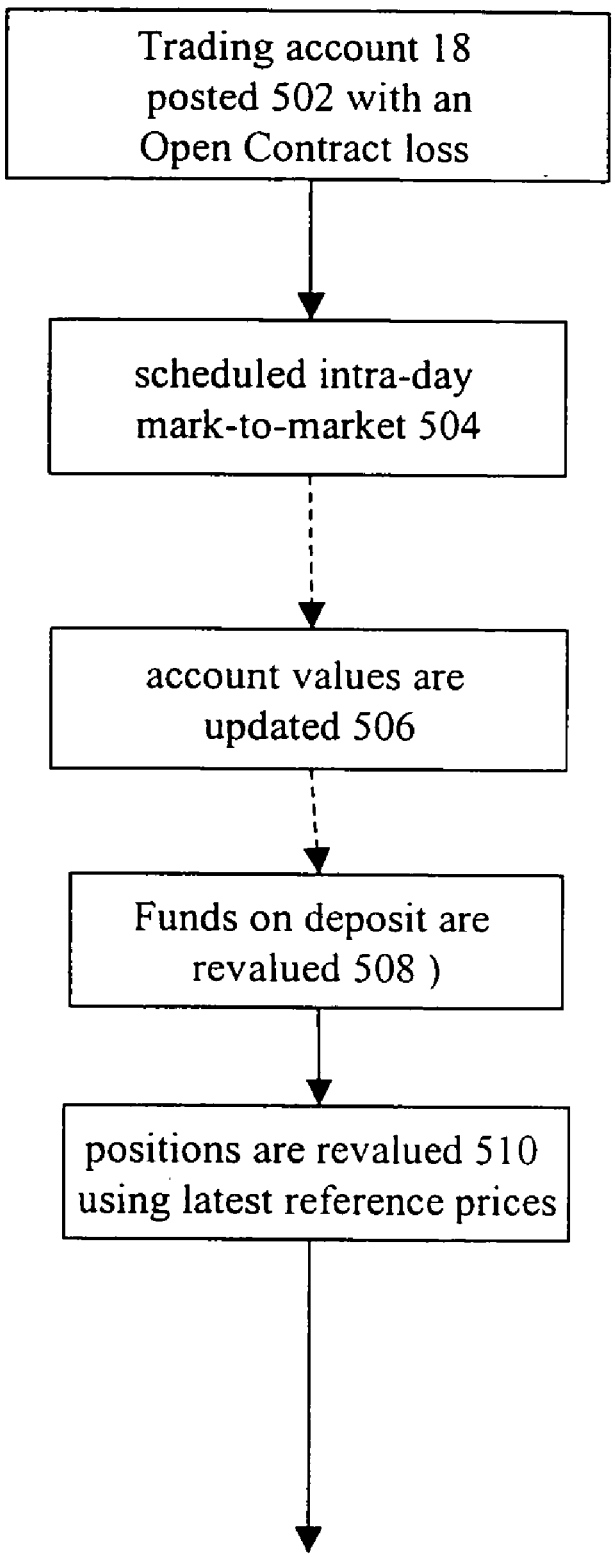
Figure 17B:
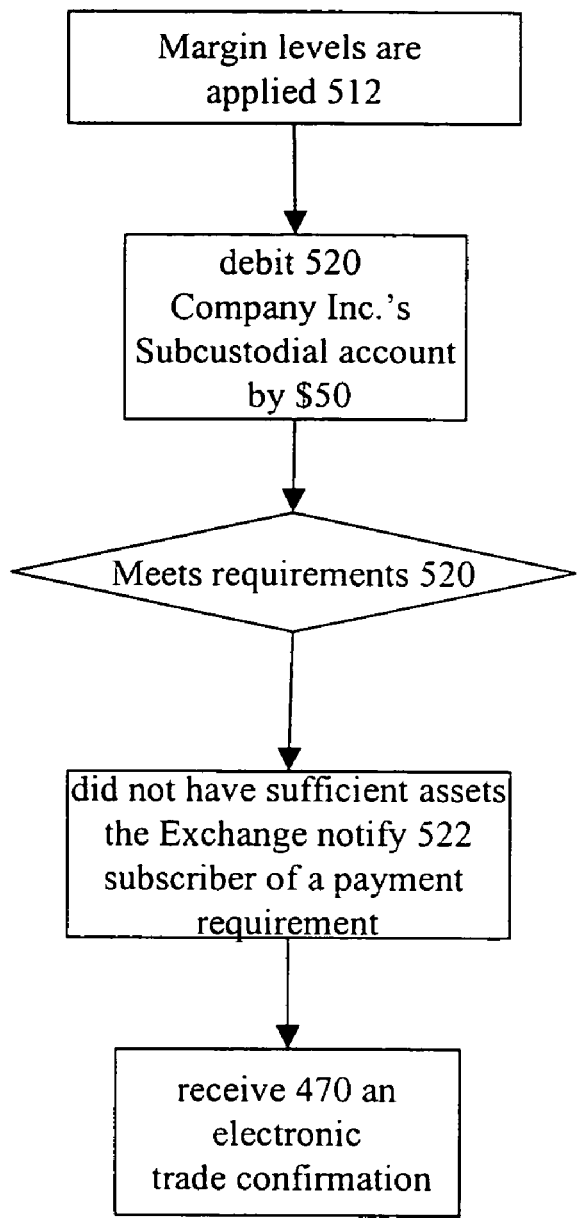

Referring to FIGS. 17A and 17B, for Company Inc.'s account, the reference price is now $0.55, which produces a loss of 0.02 per contract, or a total loss of $20.00. The Trading account 18 will be posted 502 with an Open Contract loss of $20.00. At midday, the system 11 performs a scheduled intra-day mark-to-market 504 using reference prices for all futures contracts. No pay-collect is scheduled as a routine part of this mark-to-market, but all account values are updated 506. The system 11 performs three different operations during this process. Funds on deposit are revalued 508 (e.g. to reflect changes in the value of Government securities); positions are revalued 510 using the latest reference prices; and the latest Margin levels are applied 512 (e.g. there is an intra-day change in margin rates).

End of Day Settlement—Company Inc.'s Trading Account

Company Inc. Oil Settlement Price is $0.50
Loss is 0.05 * 500 gallons * 2 lots = $50.00
Subscriber sees the following Trading Account statement:

| Funds: | Face | Available for Margin |
|---|---|---|
| Cash | 4,9500.00 | 4,950.00 |
| Governments | 60,000.00 | 57,000.00 |
| L/C | 50,000.00 | 40,000.00 |
| Margin Requirement | | |
| Company Inc. Oil 2 long @1,500.00 | | ($3,000.00) |
| Less Open Contract Gains | | $0.00 |
| Net Original Margin Requirement | | ($3,000.00) |
| Margin Availability | | $98,950.00 |

Subscriber sees the following Trading Account statement:

| Funds: | Face | Available for Margin |
|---|---|---|
| Cash | 5,0000.00 | 5,000.00 |
| Governments | 60,000.00 | 57,000.00 |

-continued

| | | |
|---|---|---|
| L/C | 50,000.00 | 40,000.00 |
| Margin Requirement | | |
| Company Inc. Oil 2 long @$1,500.00 | | ($3,000.00) |
| Less Open Contract Loss | | $50.00 |
| Net Original Margin Requirement | | ($3,050.00) |
| Margin Availability | | $98,950.00 |

The safflower oil futures market contract specification calls for daily variation margin payment. Therefore, system 11 clearing process 30 will debit 520 Company Inc.'s Subcustodial account by $50. In the event that Company Inc. did not have sufficient assets in the account, the Exchange would notify 522 subscriber of a payment requirement to be met no later than the next morning. Failure to do so would trigger the default proceedings described below. System 11 has no maintenance level margin amounts for its customers. All variation margin calls must be met regardless of amount.

In the event that the Company Inc. oil futures contract did not specify daily variation margin payment, Subscriber's account would be marked-to-market as in the Intra-day example. The subscriber's Open Contract position would show a loss of $50.00, making a total margin requirement $3,050.00 and the cash amount would remain $5,000. In either case, Margin availability is the same at $98,950.00. Notwithstanding that variation margin may not be required on a daily cycle, the exchange 11 can reserve the right to make a variation margin call (i.e. perform a pay collect) on any contract market at any time. Furthermore, the company reserves the right to make a variation margin call to any Class B member at any time.

| Contract | Specification Category | Specification |
|---|---|---|
| system 11 Company Inc. Oil Futures | | |
| | Trading unit | 30,000 lbs. |
| | Container | Railway tank car, 50-gallon drums, 10-gallon cans |
| | Price quotation | Cents/lb |
| | Daily price limit | 1 cent per pound above or below previous day's settlement price |
| | Minimum price fluctuation | 1/100$^{th}$ cent ($0.0001)/lb |
| | Expiration cycle | Monthly |
| | Last trading day | Eighth last business day of the month. |
| | Last delivery day | Last business day of the month |
| | Delivery locations | New York, Newark, Los Angeles Des Moines, Houston, Chicago |
| | Trading hours | From 6:30 p.m. preceding day to 5:30 p.m. |
| | Daily settlement time | 3:00 p.m. |
| Note: Pro-forma contract and specifications. For example purposes only. | | Note: Specifications are flexible. New specifications can be added to suite market needs. In addition, when placing an order, a buyer or seller can specify "Any" for specifications that they may be indifferent to. |

Assuming that Company Inc. defaults by incurring a defaulting event described above in conjunction with FIG. 13. For example Company Inc. fails to meet its obligations under its contracts with the system or Company Inc., has a monetary default. The subscriber's contracts will be liquidated unless there are excess assets sufficient in one or more subscriber accounts to cover the amount due, or liquidation of one or more positions will satisfy the subscriber's obligations. In the later two cases, the subscriber will remain in default and will be restricted to trade for liquidation only until a re-application for subscriber status is submitted and approved.

A monetary default occurs if Company Inc. holds a short futures contract position and does not tender a delivery notice on or before the time specified by the exchange or fails to make delivery by the time specified by the system or if company Inc. holds a long futures contract position and does not accept delivery or does not make full payment when due as specified by the system 11. A clearinghouse will be in contact with Company Inc. to determine the reason for the delivery default. Depending on the nature of the delivery default, the exchange and/or clearinghouse may liquidate the position or use the initial and/or delivery margin to mitigate the situation. In no circumstance does the clearinghouse guarantee that the actual goods specified in the contract are delivered to the long.

If the guarantor fails to timely perform with respect to any demand of payment by the exchange system 11 for assets that are in the custody account the guarantor also defaults and the exchange and clearinghouse will revoke its status as an approved financial institution and will seek to recover amounts from the guarantor subject to its agreement with the clearinghouse.

Figure 18:
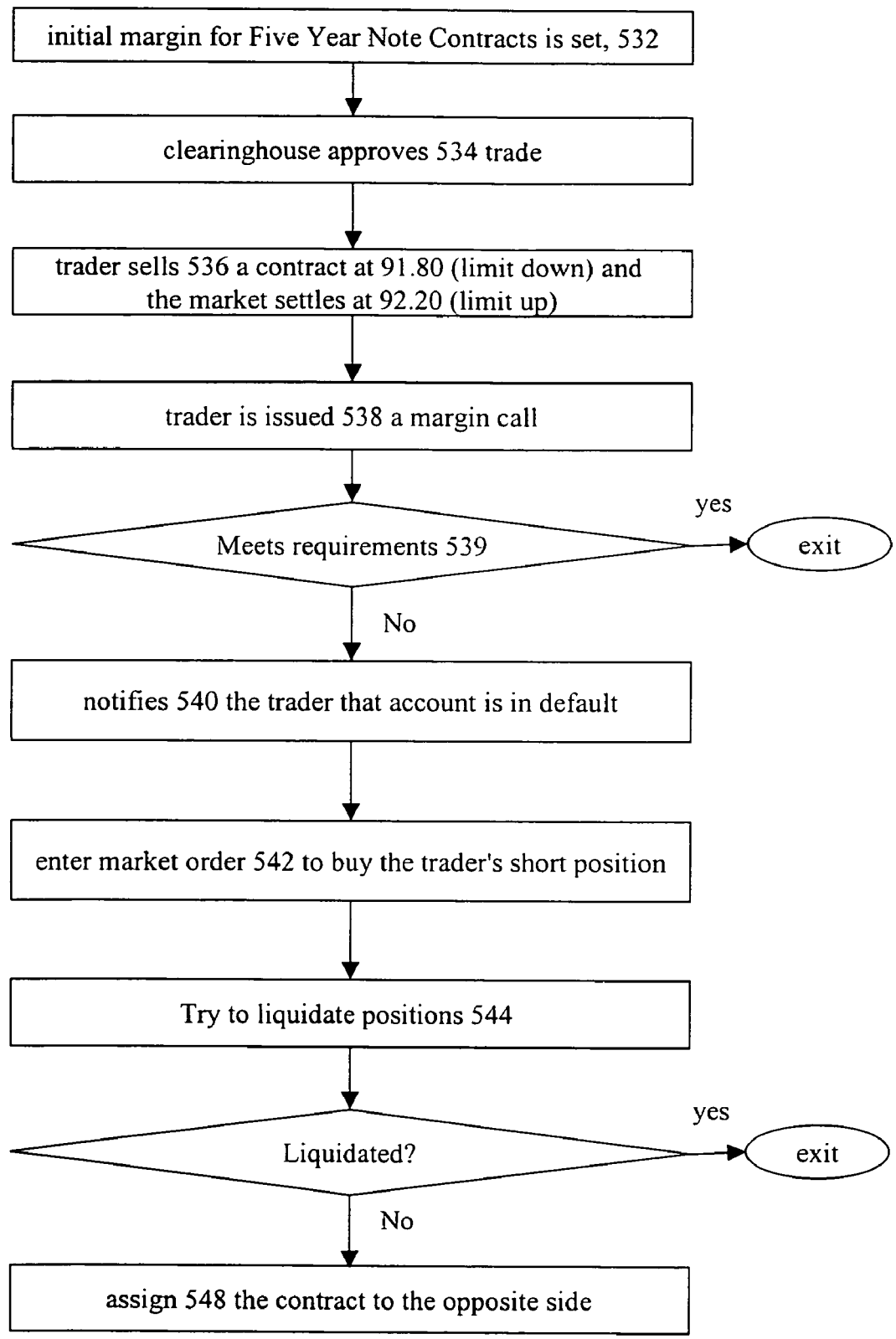
FIG. 18 is a flow chart showing an example of a liquidation process for defaults.

Referring to FIG. 18, a trader has $6,000 in a custodial account and wishes to get short one Five Year Note Contract. The scenario below shows how the system clearinghouse would handle a default. The Default process 530 is designed to eliminate risk to the clearing system by linking daily price limits to real-time collection of initial margin, which is a function of the daily price limits. Five Year Note Contract has daily price limit equal to 20 basis points or $2,000 per contract. All system contracts can have daily price limits.

In this example, the initial margin for Five Year Note Contracts is set 532 at $6,000. The trader's custodial account has exactly $6,000 so the clearinghouse approves 534 the trade. All contracts will have an initial margin not less than three times the daily price limit, which equals the maximum loss that could be incurred in two consecutive trading sessions. The prior settlement for Five Year Notes was 92.00. Assume that the day's trading range is 91.80 to 92.20 (20 basis points). The trader sells 536 a contract at 91.80 (limit down) and the market settles at 92.20 (limit up). The maximum loss a trader could experience on the first trading day equals twice the daily price limit (e.g. a sale at 91.80 with a close at 92.20 or a purchase at 92.20 and a close at 91.80). The trader is issued 538 a margin call at the end of the first trading session equal to the $4,000 loss incurred. All system contracts are marked-to-market daily. The system requires that the trader has $10,000 ($4,000 loss plus $6,000 initial margin) in his custodial account by 9 a.m. the next day 539. The sample trader fails to supplement his custodial account with the $4,000 and is therefore in default.

The exchange notifies 540 the trader that his account is in default and is being liquidated. The system 11 enters a market order 542 to buy the trader's short position back, but the market is lock limit up at 92.40 and no offer is available. The exchange does everything possible to liquidate 544 the contract in a manner that is consistent with mitigating the trader's losses.

If at the end of the second trading session, the exchange could not liquidate the contract 546 in the open market or find a suitable hedge to protect itself, the clearinghouse will assign 548 the contract to the opposite side (i.e. long) on a last-in-first-out basis at a price of 92.40. The clearinghouse thus mutualizes the of risk among market participants. While this can be used a last resort situation it is effective to maintain orderly disposition of the defaulting subscriber's assets. The clearinghouse will attempt all other liquidating processes before resorting to this assignment.

The clearinghouse having assigned 548 the position at 92.40 experiences a loss of $6,000 on this trade. Offsetting this loss is the $6,000 in initial margin coverage that the clearinghouse has in the custody account of the trader. The clearinghouse has successfully transferred both the position and liquidated the loss without experiencing a loss. In all default situations where the clearinghouse acts in this manner, it is certain to protect and maintain its financial integrity.

Figure 19:
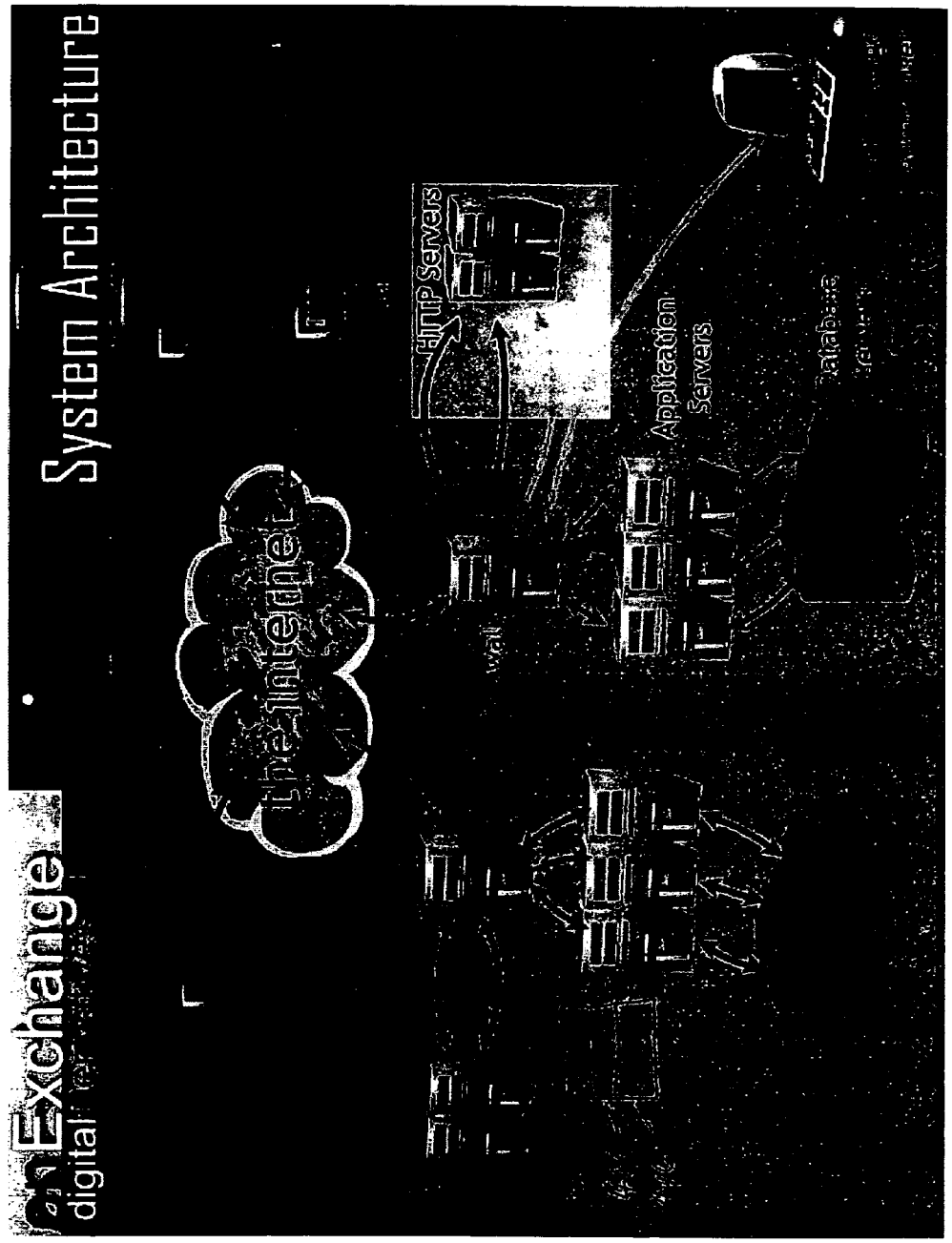
FIG. 19 is a block diagram that depicts an exemplary system architecture including a layered set of network and application-level systems.

Referring to FIG. 19, the system 11 that runs the exchange 10 has a layered set of network and application-level security processes to prevent unauthorized access to the exchange 10 and to ensure data integrity and privacy. Specific security technologies can include firewalls 410, intrusion detection 412, cryptography 414, and access control 416. Internet connectivity uses a secure socket layer, along with user IDs and passwords. The exchange 10 includes a secure database containing financial information.

All data transmissions between a user's computer and the exchange servers can be encrypted. Using standard web technology, the exchange 10 includes a network of web servers 420 that distribute the workload of communicating between the exchange 10 trading system and the users. Load balancing is used to keep all of the servers working at about the same level, providing uniform performance and response for all users. One or more database servers deliver data to fill requests from each of the web servers and ensure that all data requests are handled uniformly, so as not to enable a user or set of users any advantage over any other users. The exchange 10 can add more data servers, and apportion their use by contract genus on a dynamic basis. This process will ensure that increased trading levels in one contract genus can be isolated so as not to affect trading in other contract genera.

The Exchange 10 can have a disaster recovery plan that is organized to address Maintenance and quality control, fault detection, fault isolation and recovery from a system problem. The system can use multiple redundant installations of software components and hardware components. The system can also have redundant databases. The system will include redundant power supplies, Internet gateways, and other infrastructure components. The Exchange 10's systems can be implemented at geographically separate sites.

In one implementation standard PCS and web browsers are the only technological requirements to access the exchange 10.

Other embodiments are within the scope of the appended claims.

What is claimed is:

1. A method of clearing transactions on an electronic exchange, comprising:
    performing a full settlement run after cessation of trading;
    automatically marking-to-market all open positions;
    determining which one of a cash based margin protocol or an asset based margin protocol is required by an open position; and
    determining margin requirements for the open position according to the determined margin protocol.

2. The method of claim 1 wherein determining margin requirements determines that the open position calls for a cash margin protocol, the method further comprising:
    sending to subscribers or subscriber depository or guaranteeing banks debits and/or credits; and
    updating the resulting balances in each subscriber's account.

3. The method of claim 1 wherein determining margin requirements determines that the open position calls for an asset based margin protocol, the method further comprising:
    disseminating position information but no daily pays or collects will take place so long as sufficient assets are already identified.

4. The method of claim 1 wherein marking to market further comprises:
    posting a position for a subscriber to a subscriber trading account as soon as any portion of an order is filled.

5. The method of claim 1 wherein marking to market further comprises:
    determining whether the subscriber has a position at the other side of the market that can result in an offset of the position and the position at the other side of the market.

6. The method of claim 5 wherein marking to market further comprises:
    liquidating the trade with any resulting credit or debit identified as a realized gain or loss in the subscriber's trading account.

7. The method of claim 1 wherein determining margin requirements further comprises:
    recording assets that are delivered to the exchange for satisfying margin.

8. The method of claim 1 wherein recording assets further comprises:
    determining an equivalent asset value to reflect a capital charge applied to special classes of assets.

9. The method of claim 1 wherein recording assets further comprises:
    maintaining an asset inventory for each trading account, and indicating whether assets in the trading account are limited to covering a single contract genus or a specific delivery commitment, or can be applied to multiple products.

10. The method of claim 1 further comprising:
    determining an initial margin for each contract species held in a subscriber's trading account.

11. The method of claim 1 further comprising:
    determining a variation margin and applying the variation margin to the subscriber's trading account.

12. A computer program product residing on a computer readable medium for clearing transactions on an electronic exchange comprises instructions for causing a computer to:
    perform a full settlement run after cessation of trading;
    automatically mark-to-market all open positions;
    determine which one of a cash based margin protocol or an asset based margin protocol is required by an open position; and
    determine margin requirements for the open position according to the determined margin protocol.

13. The computer program product of claim 12 wherein instructions to determine margin requirement further comprise instructions to:
    send messages that are debits and/or credits to subscribers or subscriber depository or guaranteeing banks; and
    update a resulting balances in each subscriber's account.

14. The computer program product of claim 12 wherein instructions to determine margin requirements further comprise instructions to:

disseminating position information but no daily pays or collects will take place so long as sufficient assets are already identified.

15. The computer program product of claim 12 wherein instructions to mark to market further comprise instructions to:

post a position for a subscriber to a subscriber trading account as soon as any portion of an order is filled.

16. The computer program product of claim 12 wherein instructions to mark to market further comprise instructions to:

determine whether the subscriber has a position at the other side of the market that can result in an offset of the position and the position at the other side of the market.

17. The computer program product of claim 12 wherein instructions to mark to market further comprise instructions to:

liquidate the trade with any resulting credit or debit identified as a realized gain or loss in the subscriber's trading account.

18. A system for clearing transactions on an electronic exchange, comprising:

a computer system that is fed information regarding trades for traders on behalf of subscribers, current prices for products traded on the exchange, information regarding margin available in a trading account and margin requirements for a contract genus;

a process that executes on the compute system, comprising:

a computer program product residing on a computer readable medium for clearing transactions on the electronic exchange comprising instructions for causing the computer to:

perform a full settlement run after cessation of trading;

automatically mark-to-market all open positions;

determine which one of a cash based margin protocol or an asset based margin protocol is required by an open position; and determine margin requirements for the open position according to the determined margin protocol.

19. The apparatus of claim 18 wherein instructions to determine margin requirements further comprise instructions to:

disseminate position information but no daily pays or collects will take place so long as sufficient assets are already identified.

20. The apparatus of claim 18 wherein instructions to mark to market further comprise instructions to:

post a position for a subscriber to a subscriber trading account as soon as any portion of an order is filled.

21. The apparatus of claim 18 wherein instructions to mark to market further comprise instructions to:

determine whether the subscriber has a position at the other side of the market that can result in an offset of the position and the position at the other side of the market.

22. The apparatus of claim 18 wherein instructions to mark to market further comprise instructions to:

liquidate the trade with any resulting credit or debit identified as a realized gain or loss in the subscriber's trading account.

* * * * *